US009356950B2

(12) United States Patent
Vissamsetty et al.

(10) Patent No.: US 9,356,950 B2
(45) Date of Patent: May 31, 2016

(54) EVALUATING URLS FOR MALICIOUS CONTENT

(71) Applicant: Attivo Networks Inc., Fremont, CA (US)

(72) Inventors: Venu Vissamsetty, San Jose, CA (US); Shivakumar Buruganahalli, San Jose, CA (US)

(73) Assignee: ATTIVO NETWORKS INC., Fremont, CA (US)

( * ) Notice: Subject to any disclaimer, the term of this patent is extended or adjusted under 35 U.S.C. 154(b) by 0 days.

(21) Appl. No.: 14/466,646

(22) Filed: Aug. 22, 2014

(65) Prior Publication Data

US 2015/0326599 A1 Nov. 12, 2015

Related U.S. Application Data

(63) Continuation-in-part of application No. 14/458,026, filed on Aug. 12, 2014.

(60) Provisional application No. 61/989,965, filed on May 7, 2014.

(51) Int. Cl.
*G06F 15/16* (2006.01)
*G06F 11/00* (2006.01)
*H04L 29/06* (2006.01)

(52) U.S. Cl.
CPC ............ *H04L 63/1433* (2013.01); *H04L 63/02* (2013.01); *H04L 2463/144* (2013.01); *H04L 2463/146* (2013.01)

(58) Field of Classification Search
CPC ... H04L 63/20; H04L 63/145; H04L 63/1466; H04L 63/1475; H04L 63/1483; H04L 63/0272; H04L 63/1416; H04L 63/1425; H04L 63/1433
USPC .......... 713/150, 154, 188; 726/11–15, 22–26; 709/223–225
See application file for complete search history.

(56) References Cited

U.S. PATENT DOCUMENTS 7,299,294 B1 * 11/2007 Bruck ............... H04L 29/12216 709/201
8,205,035 B2 * 6/2012 Reddy ..................... G06F 21/53 709/227
8,375,444 B2 * 2/2013 Aziz ..................... G06F 21/554 713/176
8,438,626 B2 * 5/2013 Anderson ................. G06F 9/54 726/11
2015/0007312 A1 * 1/2015 Pidathala .............. H04L 63/145 726/22

* cited by examiner

*Primary Examiner* — Hosuk Song
(74) *Attorney, Agent, or Firm* — David R. Stevens; Stevens Law Group

(57) ABSTRACT

A system includes one or more “BotMagnet” modules that are exposed to infection by malicious code. The BotMagnets may include one or more virtual machines hosing operating systems in which malicious code may be installed and executed without exposing sensitive data or other parts of a network. In particular, outbound traffic may be transmitted to a Sinkhole module that implements a service requested by the outbound traffic and transmits responses to the malicious code executing within the BotMagnet. Requests by a user system for a resource at a URL may be received by a firewall, a honey client module may access the URL and permit installation of malicious code or other malicious activities. In response to detecting malicious activities, the honey client module characterizes the malicious activity to generate a descriptor used to detect malicious code in other systems. The URL may also be blacklisted by the firewall.

18 Claims, 16 Drawing Sheets

```
?xml version="1.0" encoding="us-ascii"?>
<ioc xmlns:xsi="http://www.w3.org/2001/XMLSchema-instance"
xmlns:xsd="http://www.w3.org/2001/XMLSchema" id="000129abd-19-attivo-ioc" last-
modified="2014-04-17T11:30:05" xmlns="http://schemas.attivo.com/2014/bot000001">
  <short_description>BotActivity_00128abd-19</short_description>
  <description>New malicious bot activity detected</description>
  <authored_by>XXX_Attivo_MDCE_YYYYY</authored_by>
  <authored_date>2014-04-17T11:30:05</authored_date>
  <links />
  <definition>
    <Indicator operator="OR" id="aaa-bbbb-xxxx-yyyy-1000x">
      <IndicatorItem id=" aaa-bbbb-xxxx-yyyy-zzzz-001 " condition="is">
        <Context document="FileItem" search="FileItem/FileName" type="mir" />
        <Content type="string">fsmgmtio32.msc</Content>
      </IndicatorItem>
      <IndicatorItem id=" aaa-bbbb-xxxx-yyyy-zzzz-002" condition="is">
        <Context document="FileItem" search="FileItem/MD5" type="mir" />
        <Content type="md5"> AC1223D7740101020304784512ABC12E</Content>
      </IndicatorItem>
      <IndicatorItem id=" aaa-bbbb-xxxx-yyyy-zzzz-003" condition="contains">
        <Context document="Network" search="Network/DNS" type="mir" />
        <Content type="string">badCandC01.com</Content>
      </IndicatorItem>
      <IndicatorItem id=" aaa-bbbb-xxxx-yyyy-zzzz-004" condition="contains">
        <Context document="Network" search="Network/DNS" type="mir" />
        <Content type="string"> badCandC02.com </Content>
      </IndicatorItem>
      <IndicatorItem id=" aaa-bbbb-xxxx-yyyy-zzzz-005" condition="is">
        <Context document="PortItem" search="PortItem/remoteIP" type="mir" />
        <Content type="IP">161.11.35.12</Content>
      </IndicatorItem>
      <IndicatorItem id=" aaa-bbbb-xxxx-yyyy-zzzz-006" condition="contains">
        <Context document="FileItem" search="FileItem/FullPath" type="mir" />
        <Content type="string">%LOCALAPPDATA%\</Content>
      </IndicatorItem>
      <IndicatorItem id=" aaa-bbbb-xxxx-yyyy-zzzz-007" condition="contains">
        <Context document="FileItem" search="FileItem/FullPath" type="mir" />
        <Content type="string">decode_update.exe</Content>
      </IndicatorItem>
       <IndicatorItem id=" aaa-bbbb-xxxx-yyyy-zzzz-008" condition="contains">
            <Context document="FileItem" search="FileItem/PEInfo/Type" type="mir" />
            <Content type="string">Dll</Content>
       </IndicatorItem>
       <IndicatorItem id=" aaa-bbbb-xxxx-yyyy-zzzz-009" condition="contains">
          <Context document="Network" search="Network/URI" type="mir" />
          <Content type="string">/ews/exchange.asmx </Content>
        </IndicatorItem>
       IndicatorItem id=" aaa-bbbb-xxxx-yyyy-zzzz-010" condition="contains">
```

FIG. 6A

```
        <Context document="Network" search="Network/SNMP" type="mir" />
        <Content type="string"> PASS@WORD </Content>
      </IndicatorItem>
       IndicatorItem id=" aaa-bbbb-xxxx-yyyy-zzzz-011" condition="contains">
        <Context document="Network" search="Network/SNMP" type="mir" />
        <Content type="string"> COMMUNity01 </Content>
      </IndicatorItem>
       IndicatorItem id=" aaa-bbbb-xxxx-yyyy-zzzz-012" condition="contains">
        <Context document="Network" search="Network/SNMP" type="mir" />
        <Content type="string"> COMMUNity01 </Content>
      </IndicatorItem>
     <IndicatorItem id=" aaa-bbbb-xxxx-yyyy-zzzz-013" condition="contains">
        <Context document="Snort" search="Snort/Snort" type="mir" />
        <Content type="string"> alert tcp $HOME_NET 21 -> $EXTERNAL_NET any (msg:"
       FTP Brute Force Login attempt"; flow:from_server,established;
       content:"530 type threshold, track by_dst, count 10, seconds 120; sid:102353; r
       ev:10;)
       </Content>
      </IndicatorItem
      </Indicator>
      <Indicator operator="AND" id=" aaa-bbbb-xxxx-yyyy-zzzz-004">
        <IndicatorItem id="4bba1235-f621-40f7-b34f-8c340d9de7ad" condition="contains">
          <Context document="RegistryItem" search="RegistryItem/Path" type="mir" />
          <Content type=
               "string">Software\Microsoft\Windows\CurrentVersion\Run</Content>
        </IndicatorItem>
        <Indicator operator="OR" id=" aaa-bbbb-xxxx-yyyy-zzzz-015">
          <IndicatorItem id="d4e9da77-60dd-4243-9d14-3460b1d90dd2"
               condition="contains">
            <Context document="RegistryItem" search="RegistryItem/Value" type="mir" />
            <Content type="string">\Windows NT\svchost.exe</Content>
          </IndicatorItem>
          <IndicatorItem id=" aaa-bbbb-xxxx-yyyy-zzzz-016" condition="contains">
            <Context document="RegistryItem" search="RegistryItem/Value" type="mir" />
            <Content type="string">\Windows NT\svclogon.exe</Content>
          </IndicatorItem>
        </Indicator>
      </Indicator>
    </Indicator>
  </definition>
</ioc>
```

FIG. 6B

EVALUATING URLS FOR MALICIOUS CONTENT

RELATED APPLICATIONS

This application claims the benefit of U.S. Provisional Application Ser. No. 61/989,965, filed May 7, 2014, and entitled Distributed System for Bot Detection. This application is also a Continuation in part of U.S. application Ser. No. 14/458,026, filed Aug. 12, 2014, and entitled Distributed System for Bot Detection, both of which are hereby incorporated herein by reference in its entirety.

BACKGROUND

In information technology (IT) and networking, the word "Bot" is derived from "robot" and refers to an automated process that interacts with other network elements. Bots may be configured to automate tasks that would otherwise be conducted by a human being. A growing problem is the use of Bots by malicious entities to attack and gain unauthorized access to network-connected computers and other network resources via the Internet.

One type of Bot process may initially run on a computer controlled by the malicious entity. It may probe victim networks and computers for vulnerabilities, and upon finding such, exploits them to access information, often personal information of individuals stored in computers. A Bot may install a program known as "malware" on a victim computer merely for the malicious purpose of randomly displaying rude messages or perhaps even damaging the victim's file system. The malware program may then perform one or more automated processes, which itself may be a type of Bot.

In recent years, Bot exploits have become much more sophisticated and financially rewarding for the malicious entities. For example, the modern Bots may be programmed to access the victim's computer and surreptitiously access certain websites and click on advertisements that are displayed there. In "pay per click" type advertising, each click from a potential buyer generates revenue for the displaying website. Thus, clicks generated by the Bot could create undeserved revenue for the displaying website. In the art, this is called "click-fraud."

The problem is greatly compounded by the fact that Bots on a victim's computer may be programmed to probe the network for additional victims, and install itself on their computers. Victims on the same local network as the first victim computer may be particularly vulnerable, because they may exist behind any corporate firewall or intrusion detection system designed to protect against Bots or malware. This is because many local computers are often addressed privately and may not be visible outside the corporate firewall, but can be readily accessed by other local computers. Also, local computers may erroneously assume that communications from other local computers are benign. Thus, once one local computer is infected, the number of infected computers may increase significantly.

Bots that have been installed on victim computers may maintain communication with what is known in the art as a Command and Control facility ("C&C") operated by the malicious entity. A collection of such Bots is known in the art as a "Botnet" and has the potential to cause widespread damage, which may not even be evident to victim computer systems. Click fraud is an example that can go unseen initially. If a large Botnet were programmed to cause widespread click fraud, it could potentially generate a significant number of clicks from a diverse set of fraudulent buyers, causing substantial adverse economic impact. A large Botnet could also be used to cause a large amount of spurious traffic to overwhelm and shut down a targeted website. This is known in the art as a "distributed denial-of-service attack."

Besides trying to keep Bots out of a local network, conventional security systems also focus on trying to detect the presence of Bots on infected computers within the local network. One way to do this is to analyze the behavior of a known-infected computer, and generate a "signature" according to a "schema" to summarize the behavior of the Bot. A schema is a multi-element template for summary information, and a signature is a schema that is populated with a particular set of values. A detailed example is given later. Typically such a schema and signature would be created by the security company that is protecting the local network, distributed to customers, and then used by anti-virus, anti-malware software installed on each computer in the customer's network to fight off known Bots. However, the usefulness of this approach is limited, because the ability for any anti-malware or anti-virus software operating on any single local computer to ascertain the number of details in and the sophistication of the schema and signature is limited by what can be observed. Also, this approach is typically not effective against attacks early in the lifetime of a new Bot, known in the art as "Zero-Day Attacks", because developers of the anti-malware and anti-virus software do not have the opportunity or time to create a corresponding schema and signature for a new Bot.

Honeypots are known in the art as counter deceptive decoy systems that may be deployed along with production systems to distract attackers such as Bots from particular targets, luring attacker/hackers away in order to observe and learn the malicious behavior in a controlled environment as well as to trap the attackers.

A Honeypot appears to an attacker to be a legitimate, active component of the network containing information or resources that would be valuable to attackers, but is actually isolated and monitored. The idea is similar to the police baiting a criminal and then doing undercover surveillance.

So-called research Honeypots can capture a lot of information about specific, known threats, but are complex and expensive to deploy and maintain, and are therefore used primarily by research, military, or government organizations. In a production network, it is simpler and more economical to deploy a low-interaction Honeypot, but such a Honeypot typically can collect much less information about an attack and its lifecycle, and may be ineffective at identifying and characterizing Zero-Day Attacks. A production Honeypot, even with high interaction, may be designed more to waste the attacker's time that to analyze and characterize its behavior and share the detailed characterization with a larger community.

As will be seen, the systems and methods described herein address shortcomings such as these in an elegant manner, by providing a highly structured, distributed, and extensible means for constructing very detailed characterizations of attack behaviors and for sharing such characterizations within a local network and beyond

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 6A and 6B illustrate an example schema generated in accordance with an embodiment of the present invention;

DETAILED DESCRIPTION

Figure 1:
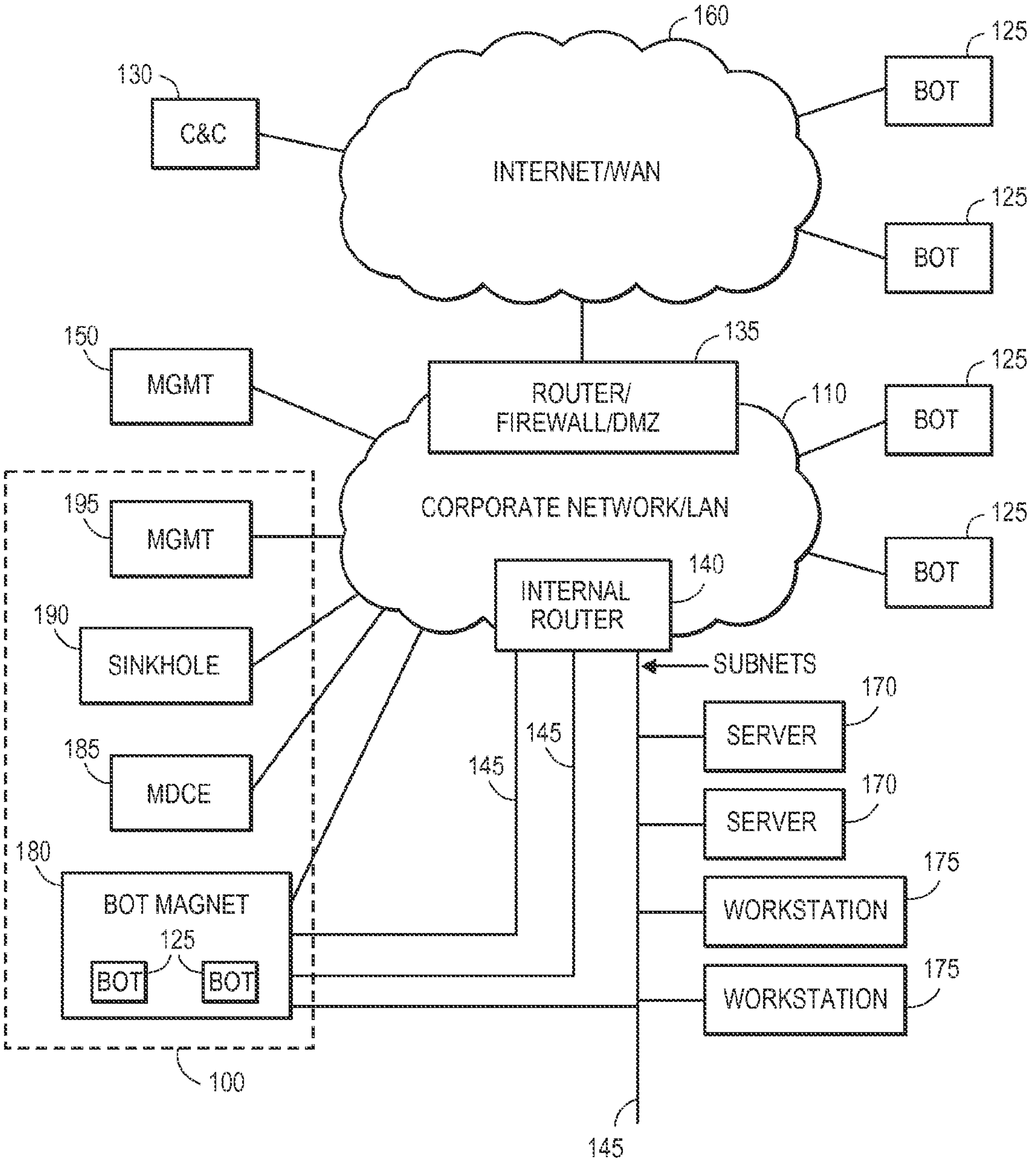
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Conventional honeypots have limitations and shortcomings in areas related to methods of data collection, engagement, detection, supporting multiple operating systems (OSes), services and applications, scaling, number of subnets and IP addresses watched, tapping information from the cloud as well from other sources, correlating multi-dimensional events, identifying Bots, generating incident reports, and are not generally designed to integrate with other existing security solutions in the cloud The systems and methods disclosed herein provide an improved bot-detection system that addresses the foregoing limitations of conventional approaches. In one embodiment, virtualization is used to host multiple guest operating systems (GuestOSes) implementing honeypots that provide various types of network services and applications for addressing Bots, logging insider bad behavior, and performing advanced persistent threat (APT) detection.

In one example, a bot-detection system architecture is configured to scale in terms of the number of subnets and total number of IP addresses supported. In another example, a Bot-detection system can be deployed in an enterprise, perimeter, DMZ (referred to in the art metaphorically as the demilitarized zone, because it is meant to isolate the corporate network from potential outside attackers) and/or cloud. In one embodiment, the Bot-detection system architecture may be configured in a single network appliance, referred to herein as the Botsink.

One embodiment is configured to perform novel identification and analysis of Bots and characterizing specific Bot behaviors in real time, allowing Bots to be detected and characterized quickly and accurately. This allows anti-Bot countermeasures to be put in place quickly and effectively. In yet another embodiment, a Bot-detection system may quickly share learned Bot characteristics among a community of interested or affected network sites. This would improve Bot characterizations and would further allow for installations of countermeasures before more Bot attacks occur.

FIG. 1 illustrates one example of a novel Bot-detection approach according to one embodiment of the invention. A computer network 110 is connected to the Internet 160. The network 110 may be owned and operated privately by a corporation, or may alternatively be owned and operated by government, military, educational, non-profit, or other types of entities. The network will be referred to as a corporate network 110 for simplification of discussion, and those skilled in the art will understand that "corporate" may be substituted with other entity types within the spirit and scope of these descriptions. The corporate network is drawn as a cloud, and particular devices are shown with connections to the cloud, and these connections represent various hardware and software configurations known in the art for communicating among devices. A number of devices including routers, switches, firewalls, security appliances, and other devices may be connected at the interface between the Internet 160 and the corporate network 110. In some configurations, this collection of devices 135 is sometimes referred to metaphorically as the "DMZ", where it is meant to isolate the corporate network from potential outside attackers. Additional network devices may exist inside the corporate network, but not included in this illustration to avoid obfuscation of the drawing and related description.

Bots 125 may be present in the corporate network 110 as well as in the Internet 160. A command and control (C&C) facility 130 operated by the originator of the Bots 125 may also be connected to the Internet 160 and communicate with Bots 125 using the Internet 160, through the corporate network 110, and/or using more sophisticated means intended to hide its whereabouts.

The detailed interconnections of devices with each other and with routers, switches, and the like within the corporate network 110 may be made in a variety of ways. For example, routers such as router 140 may further partition the network into multiple subnets 145 for management, performance, resource allocation, and other purposes. End-devices connect to the subnets 145 and may include servers 170 and workstations 175. A management station or server 150 may be used by network administrators to observe and control the network 110.

In one example, the corporate network 110 may be a local area network (LAN), where its elements are often located at a single geographic site. The Internet 160 is drawn as a cloud, and may be a Wide Area Network (WAN), where it connects geographically dispersed sites.

While elements of a corporate network 110 may be co-located at a single geographic site, they also may be located at multiple sites and connected to each other with private links. In the latter case, the overall network may still be represented as a single "corporate network" cloud 110. If desired, the various examples described herein may be used in such a network to protect against internal threats. This may be done in one example by treating certain internal networks, devices, and services with the same circumspection that is applied to the public Internet in other examples described herein. To avoid obfuscation, the examples described herein will assume that all threats are either connected to the corporate network 110 via the public Internet 160 or located within the local corporate network 110 as shown.

The Bot-detection system 100 may have various configurations depending on particular applications. In one example, a server device called the BotMagnet 180 is attached to one or more subnets 145. A plurality of subnets 145 may be connected to the BotMagnet 180 using one physical interface per subnet, or by combining the subnets onto a smaller number of physical links. In one operational example, the BotMagnet may lure and/or engage with Bots 125. In another example, the BotMagnet may allow Bots to infect it, and may also collect data about the Bots' behavior and characteristics.

The BotMagnet 180 may share collected behavioral or character data with a Multi-Dimension Correlation Engine (MDCE) 185. The MDCE may record and correlate information about the behavior of one or more Bots 125, such as for example multiple instances of the same Bot, and may build a new or augment an existing schema and signature that summarizes the Bots' behaviors and characteristics, as described later in the "Schemas and Signatures" section.

In one example, a Bot 125 may gather local corporate data, and may in turn cause such data to be sent back to other Bots 125, to the C&C facility 130, or elsewhere. The BotMagnet 180 may block such potentially harmful "leaks" of private corporate data, and instead gather it in a device called the Sinkhole 190. Software in the Sinkhole 190 can analyze the characteristics of such data to further enhance Bot detection. It can also optionally substitute innocuous data for the private data in order to prolong Bot engagement without harm. The Bot-detection system 100 may further include a management station or server 195 used by network administrators to observe and control the operation of the system. Secure methods are used, as appropriate, for communication among elements of the Bot-detection system 100. The attributes and manner of operation of the components illustrated in FIG. 1 are described in greater detail below.

Scaling the Bot-Detection System

Referring again to FIG. 1, a Bot-detection system 100 may be attached to, e.g. in data communication with, a number of subnets in a corporate network 110. The Bot-detection system need not connect to all of the subnets in the corporate network, but the system's Bot-detection effectiveness may be improved by connecting to as many subnets as possible. In a large network, it may be desirable or necessary to deploy a larger Bot-detection system in disparate locations. Reasons to deploy a larger system include performance (a corporate network may receive too much attack traffic for a small system to handle), co-location (network may extend over a corporate campus or multiple geographical sites), and ease of management (physically located with different equipment clusters or managed by different departments). For example, if the network 110 has several internal routers 140, each of which partitions the network into subnets 145, then it may be desirable to deploy multiple BotMagnets 180, with each one handling all or a subset of the subnets 145 created by one internal router 140.

The MDCE 185 may or may not be replicated in a larger Bot-detection system. In one embodiment, a separate MDCE 185 may be associated with and receive Bot behavioral information from each BotMagnet 180.

However, Bot detection is enhanced if the MDCE can collect and correlate Bot behavioral information from as many sources (BotMagnets 180) as possible, thereby increasing the generality and accuracy of Bot-detection schemas/signatures. Thus, in another embodiment, a single MDCE may collect such information from all the BotMagnets.

Figure 2:
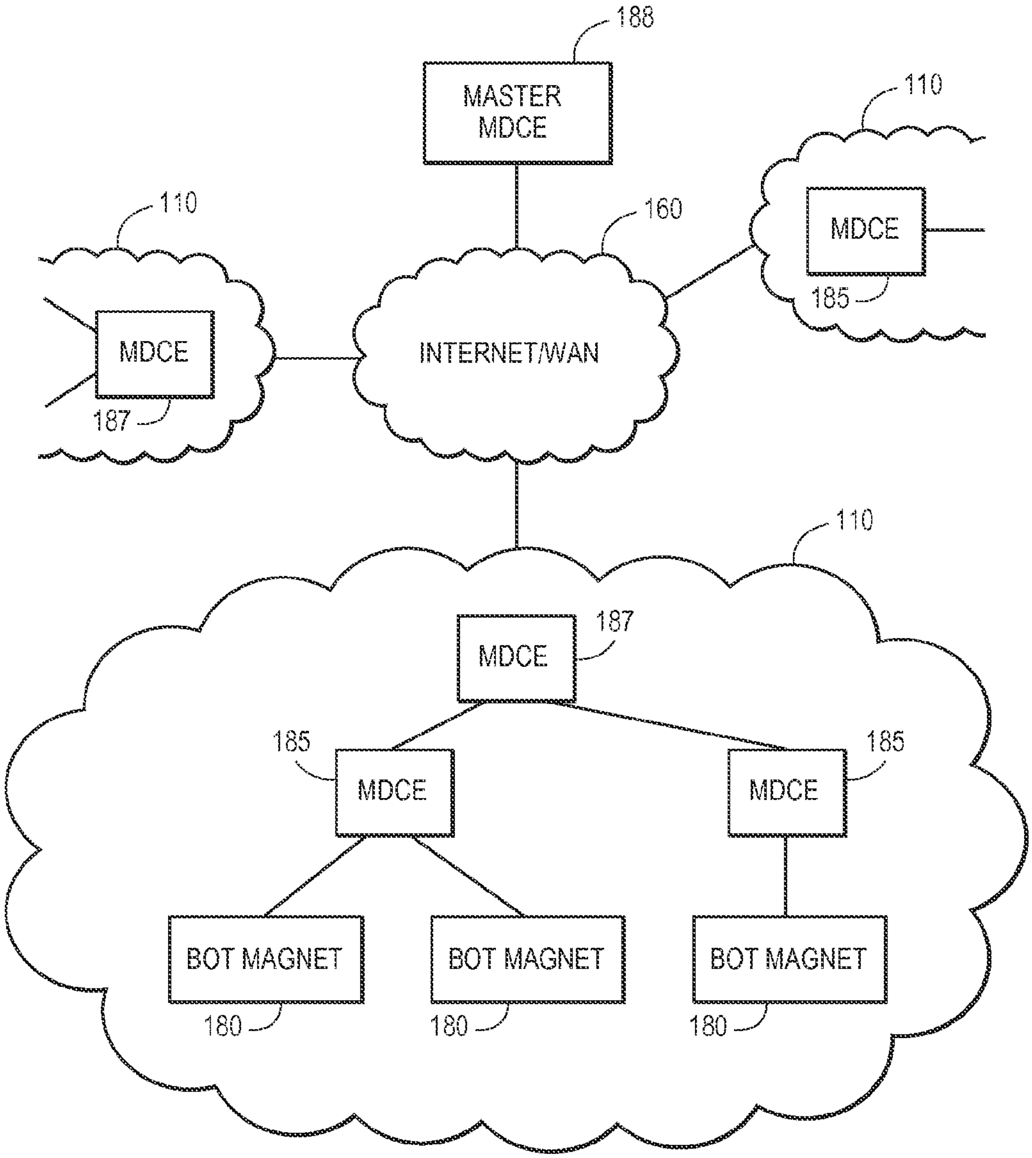
FIG. 2 is a schematic block diagram showing components for implementing methods in accordance with an embodiment of the present invention.

In yet another embodiment, Bot behavioral information may be collected and correlated in a hierarchical way, as shown in FIG. 2. Each first-level MDCE 185 may collect and correlate Bot behavioral information from one BotMagnet 180, or a small number of BotMagnets 180. A second-level MDCE 187 may then collect and further correlate summaries of Bot behavioral information from the first-level MDCEs 185.

The hierarchy may be further extended. In particular, it is possible for an MDCE 185 or 187 to communicate through the Internet 160 with other MDCEs serving other corporate networks 110, for the beneficial purpose of sharing information about new Bot attacks. Such sharing could be done strictly hierarchically, with a "master, top-level" MDCE 188 existing somewhere in the cloud or within a corporate network 110 and maintaining a master database of Bot behavioral information. In some embodiments, advantageously, multiple MDCEs 185 or 187 may have a peer-to-peer relationship, much like the one that exists among other internet devices for distributing routes, providing domain-name services, and the like—continuously updating each other with respect to content generated according to the methods described herein by using methods understood by one skilled in the art.

Referring again to FIG. 1 and to scaling of the Bot-detection system 100, the Sinkhole 190 may also be replicated, with each Sinkhole 190 serving one or a small number of BotMagnets 180. The degree of replication may be dictated by performance requirements, co-location convenience, and other factors.

The Management Station or Server 195 may be replicated. Within a corporate network 110, it is typically desirable to centralize network management. This would suggest managing as many Bot-detection systems 100 with a common Management Station or Server 195, or even integrating system 100 management with an existing, overall Network Management Station or Server 150. But for performance, organizational, or other reasons, it may be desirable to provide a separate Management Station or Server 195 for each Bot-detection system 100, as will be understood by one skilled in the art. As will be understood, this is possible and a hierarchical approach again may be employed.

Virtual Machines (VMs)

A Virtual Machine (VM) is known in the art as an implementation of a computer that operates like a single, standalone computer, but in fact is one of a plurality of such implementations running on a single hardware platform. Historically, the first VMs were pure software implementations; recent years have seen the development of both hardware and software to support easy and efficient deployment of VMs on the latest generations of microprocessors. VMs may be deployed on microprocessors containing a single hardware processor (CPU), as well as on microprocessors containing multiple processors.

A collection of VMs operating on a single microprocessor may be created and controlled by a low-level operating system called a hypervisor. Each VM is in turn controlled by a traditional operating system (OS), which is typically unaware that it is running in a VM rather than on a single, standalone computer. Different VMs on a single microprocessor may run different OSes, and different applications may run on each. VMs controlled by a single microprocessor are typically isolated from each other and cannot communicate with each other using traditional memory sharing and other techniques. Rather, they must communicate with each other through a "network." However, they need not actually communicate over the physical network. Rather, the hypervisor can create simulated networks or "bridges" through which they can communicate, with the hypervisor arranging internally to transfer data from one VM to another.

In one embodiment, a BotMagnet 180 may use a VM to host a GuestOS that appears to be a real server 170 or workstation 175, insofar as other devices in the network are concerned. Using multiple VMs, the BotMagnet 180 can take on the appearance of being multiple servers 170 and workstations 175 at different IP addresses running multiple applications and services for the purpose of luring Bots 125, detecting them, and analyzing their behavior. Further, the BotMagnet 180 may use one or more additional VMs to host its own protected software for overall BotMagnet control and Bot detection and analysis.

The Sinkhole 190 may also include or be embodied by one or more VMs each programmed to receive and analyze the outgoing traffic from GuestOSs that are engaged with Bots 125 within a BotMagnet 180. For example, the sinkhole 190 may implement one VM for each GuestOS that is engaged with a Bot.

Basic Bot-Detection System Operation

The BotMagnet 180 may have one or more interfaces for communicating with subnets 145 in the corporate network 110. The network administrator or some other network management module (e.g. a dynamic host configuration protocol (DHCP) module) configures the BotMagnet 180 with one or more otherwise unused IP addresses from the subnets 145, e.g. assigns an IP address to the BotMagnet by which packets may be addressed to the BotMagnet 180. The network administrator may use the Management Station/Server 195 to perform such configuration. The BotMagnet 180 then may create a GuestOS VM corresponding to each such IP address. Thus, each GuestOS VM may have its own IP address, and through the Hypervisor may also be assigned its own unique MAC address for layer-2 network connectivity. Thus, each GuestOS VM, for all outward appearances, may behave like an independent physical computer communicating at its assigned IP address. Each GuestOS VM is an instance of an operating system, which may be a different OS or version thereof on different VMs. Each GuestOS VM is also loaded with a set of applications, such as web applications and services, which again could be different on different VMs. OSes, applications, and services may be configured either by the network administrator or automatically by the Management Station/Server 195 to ensure that the BotMagnet is hosting an appropriate mix of potentially vulnerable software.

Applications and services existing on a GuestOS VM (or on any server or workstation, for that matter) are accessed by potential clients when clients access them through the network interface. A typical application or service may be accessed using a well known protocol such as TCP or UDP and a "port number" such as SMTP (25), HTTP (80), RLOGIN (513), FTP (20-21), or one of many others. If a computer does not offer a particular application or service, it may discard incoming traffic directed to the corresponding port. Otherwise, it directs such traffic to the appropriate application or service program. Thus, a GuestOS may accept only inbound traffic corresponding to the applications and services that have been configured on it.

Bots 125 and other malicious entities perform "port scans" on target networks in order to find available applications and services, and then engage with them with the goal of finding vulnerabilities that can be exploited to gain further access to the target. A port scan typically attempts communication with all of the IP addresses that might be used in the target network, and for each IP address it attempts all of the port numbers for which it may be able to find a vulnerability.

Thus, if a large proportion of a network's IP addresses are assigned to the Bot-detection system 100, and a large number of applications and services are offered there, there is a high probability that a Bot's port scan will soon encounter a GuestOS VM in the Bot-detection system where its behavior will be recorded and subsequently analyzed.

The Bot-detection system 100 is designed to attract Bots 125 and allow them to infect GuestOS VMs, so that behavioral details of Bot operation can be recorded and subsequently analyzed. The GuestOSes in the BotMagnet 180 may have no special mechanisms to prevent Bot infections. Indeed, Bot infections are desired.

Consider a Bot 125 that is able to communicate with a GuestOS VM through the FTP port. It may try to download an executable file such as a copy of itself into the GuestOS file system, and subsequently try to execute it. If these operations would have been allowed by the GuestOS, applications, and services running on a real computer, they will be allowed on the GuestOS VM. The GuestOS VM therefore becomes infected.

Bot operations on a GuestOS VM may advantageously be contained such that they cannot actually harm the corporate network 110 and the devices attached to it. Because of the Bot's containment in a VM, it can be prevented from doing any direct harm. To understand how this is done in some embodiments, the concepts of "inbound" and "outbound" traffic on a VM should first be understood. Inbound traffic is traffic from an external entity that results in the VM taking internal actions, such as allowing the entity to log in or run a service or program, or accepting data that is sent to it, such as storing a file that has been downloaded by the external entity. Outbound traffic is traffic in which the VM sends potentially private data to an external entity. For example, a web page that is normally visible to all external entities is not considered private, while an arbitrarily selected file may be considered potentially private. A basic principle of operation for a GuestOS VM is that it may allow and act upon all inbound traffic from external entities, while it may block all outbound traffic directed to external entities.

For example, suppose the Bot 125 now running within the infected GuestOS VM tries initiate its own port scan of the corporate network, or tries to transfer a file back to its C&C facility 130 using FTP. The BotMagnet 180 may be programmed such that no outbound traffic can be sent from a GuestOS VM to the corresponding connected subnet 145. Thus, the consequences of the infection are effectively blocked, no matter how bad things may look inside the infected GuestOS VM.

On the other hand, it may not be possible to fully record and analyze the behavior of a Bot 125 unless it is allowed to continue its engagement in a meaningful way. The Sinkhole 190 is the system component that makes this possible in some embodiments. For selected inbound traffic, the BotMagnet 180 may be configured to forward such traffic to the Sinkhole 190, which may contain one or more VMs corresponding to each GuestOS VM of the BotMagnet 180 with which it is currently engaged. Each Sinkhole VM may further configured with the applications and services that it is expected to handle.

For example, if a Sinkhole VM is expected to handle HTTP traffic, then it could be configured with an Apache Web Server. Outbound traffic from the Apache Web Server may then be sent back to the requester (such as a Bot 125 elsewhere in the corporate network 110 or Internet 160). The web pages and other information visible through this server would be configured in much the same way as in a conventional honeypot, in order to lure a Bot 125 to engage further without disclosing anything of value. This provides an opportunity to record and analyze the further behavior of the Bot 125 on an infected target.

The MDCE 185 receives extensive log information from both the GuestOS VMs and the Sinkhole VMs, as well as certain information gleaned by the BotMagnet's control software (which manages the VMs). Thus, the MDCE is able to track the engagement and profile the entire lifecycle of a Bot 125. Once the Bot's behavior has been profiled in a schema/signature, the MDCE 185 may create an alert notifying the network administrator, and optionally may distribute the schema/signature to potential victim servers 170 and workstations 175 in the network. As is understood in the art, after receiving an alert, the network administrator may take steps to prevent further infection, such as blocking the attacker at the network DMZ/firewall. Also, upon receiving a schema/signature describing the new threat, anti-virus/malware software running on a potential victim can take automatically take action when a matching behavior is detected, as is understood in the art. To discover already infected victims, a network administrator can invoke thorough virus/malware-scanning operations to be run on each potential victim, and/or can use standard software tools to examine their log files for behavior patterns that match the schema/signature, as is also understood in the art.

The Bot-detection capabilities of the system 100 are enhanced by the system's ability to capture and correlate events occurring both in the GuestOS VMs when an infection begins, and in the Sinkhole VMs, as the consequences of an infection begin to occur. However, embodiments of the invention are possible with no Sinkhole 190 or no BotMagnet 180.

For example, operating without a Sinkhole 190, it is still quite feasible for a GuestOS VM in the BotMagnet 180 to send log information to the MDCE 185, which can correlate information from this and other GuestOS VMs in order to build a profile, albeit a less extensive profile than what could be done in a complete system. Yet such a system still has the advantage of creating such profiles from multiple infected GuestOS VMs and subnets, and such profiles may also be correlated with Bot information gleaned from other facilities.

Conversely, operating without a BotMagnet 180, it would still be possible for real servers 170 and workstations 175 to be configured with software that collects behavioral information such as logs and sends it to the MDCE 185 for correlation with other information as before. Further, if the real server 170 or workstation 175 is "suspicious" about any activity, for example based on its origin or behavior pattern, it may forward the session to the Sinkhole 190 for engagement, in much the same way that a BotMagnet GuestOS VM would as described above. In this case, the MDCE can build a more complete profile, because it can correlate behavioral information from both the originally targeted real server 170 or workstation 175 and the Sinkhole 190.

In yet another example, embodiments could be combined with application Ser. No. 14/074,532 filed Nov. 7, 2013, which is incorporated herein by reference in its entirety. The Inspector 255 in that application, instead of redirecting blocked traffic to a Labyrinth 257 or 258, could redirect it to a GuestVM OS in the BotMagnet 180 or directly to the Sinkhole 190. One or more GuestVM OSes and corresponding Sinkhole VMs may be instantiated to handle such traffic, either by configuration or dynamically as needed. As the MDCEs 185, 187, and 188 in present invention are designed to share information with other MDCEs and security services, they could also share information as appropriate with the Cloud Inspection Service (CIS) 262 in application Ser. No. 14/074,532.

For robust operation of the Bot Detection System 100, communication among the BotMagnet 180, the MDCE 185, the Sinkhole 190, and the Management Station or Server 195 should be secure. Conventional methods may be used to encrypt such communication. Also, it is important to ensure that the MDCE 185 and the Management Station or Server 195 cannot become infected, and that BotMagnet 180 and the Sinkhole 190 can become infected only within the GuestOS and Sinkhole VMs as desired, and not within their supporting VMs and processes. This can be ensured, in part, by using secure, private communication between these elements, for example by using secure tunnels. In the Botsink appliance, described next, most of such communication privacy is inherent because communication occurs internal to the appliance.

BotSink Appliance Architecture

Figure 3:
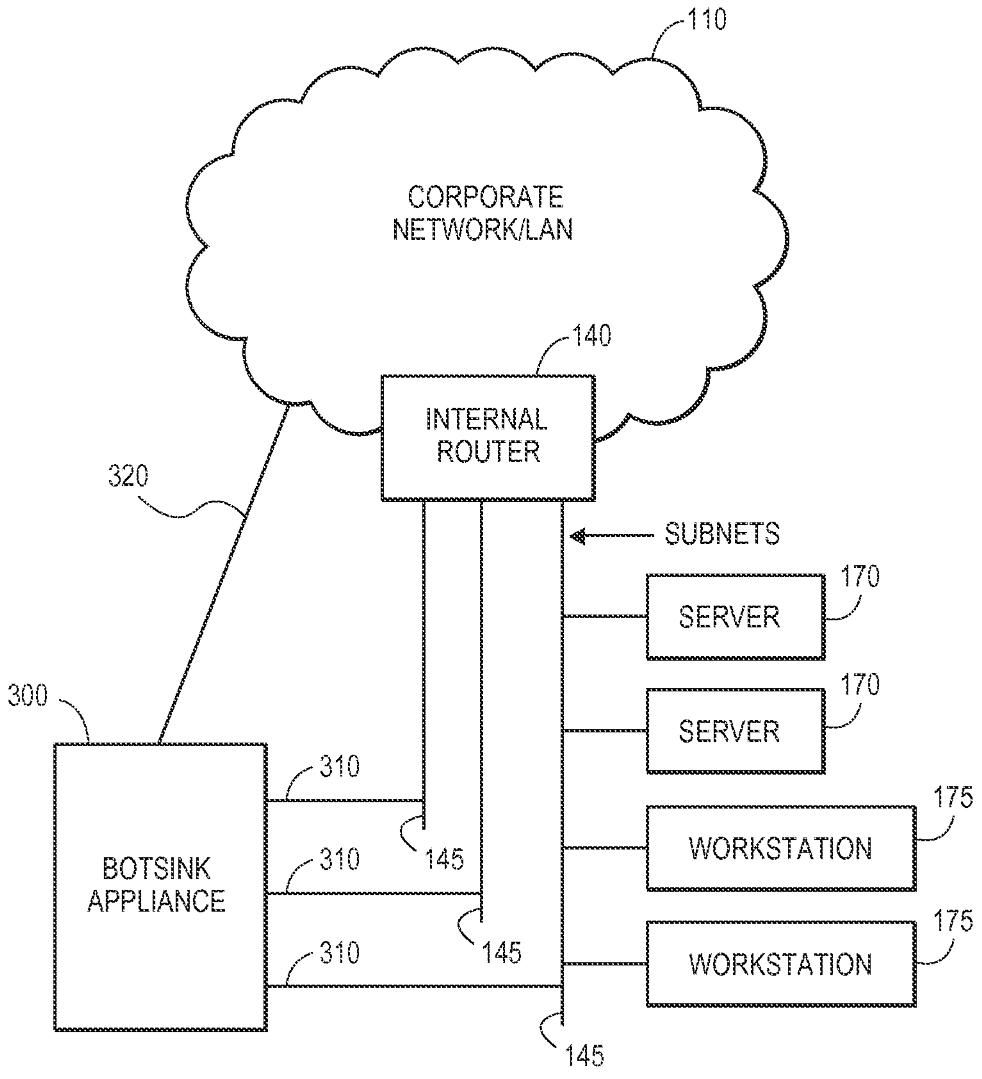
FIG. 3 is a schematic block diagram showing integration of components with a corporate network in accordance with an embodiment of the present invention.

In a preferred embodiment, the Bot-detection system 100 is integrated into a single network-connected device, called the BotSink appliance. As shown in FIG. 3, the BotSink appliance 300 connects to multiple subnets 145, using one or more physical interfaces 310 as discussed previously in connection with FIG. 1. BotSink appliance 300 may also connect through an interface 320 to the corporate network 110 for the purposes of communicating with other BotSinks or standalone MDCEs 185 or 187, Management Stations or Servers 195 or 150, and for any other required purpose. Secure communication is used as appropriate. The interface 320 to the corporate network may or may not use the same physical link(s) as the subnet interface(s) 310.

Figure 4:
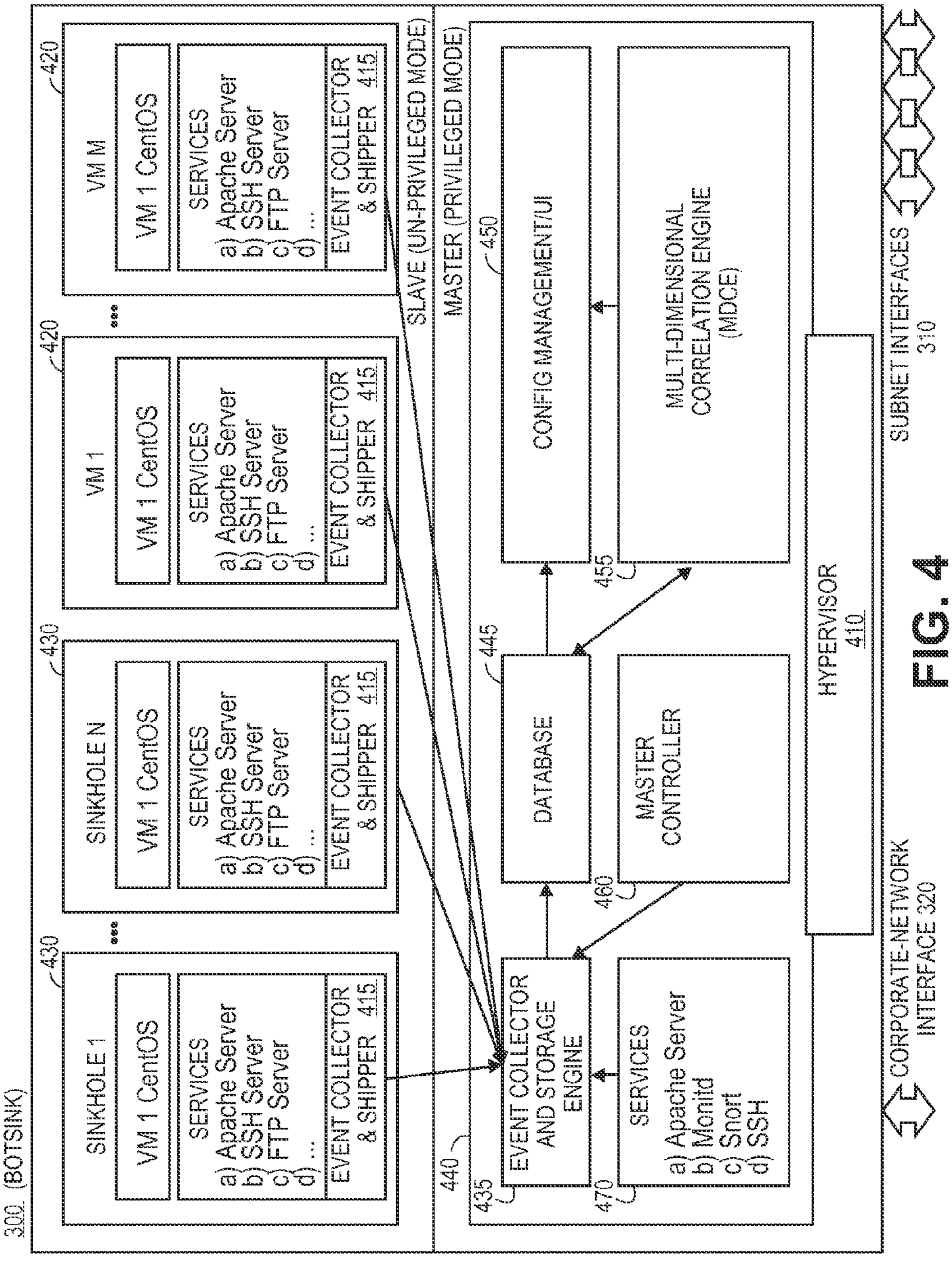
FIG. 4 is a schematic block diagram illustrating virtual machines and other components implemented in accordance with an embodiment of the present invention.

FIG. 4 shows major software components of the BotSink 300. It hosts multiple GuestOSes with multiple services to lure bots and uses distributed processing both for data/traffic collection and analysis. The appliance supports multiple interfaces, both physical and virtual interfaces, that can be plugged into different parts of the physical/virtual networks. The unique features and capabilities of the BotSink appliance are based on a distributed architecture comprising the following components running in multiple VMs:

1. The Hypervisor 410 that provides virtualization.
2. GuestOS VMs 420 for loading different types and instances of operating systems and performing some or all of:
   a. Running various network and applications services
   b. On some or each of the GuestOS VM the following set of services may be run:
      i. Log collection across various modules
      ii. Transformation of the raw logs into well defined formats
      iii. Forwarding events to a centralized location handled by Log Shipper.
3. Sinkhole VMs 430 to be the destination for selected traffic originating from each of the Guest VMs. 3. The sinkhole VMs 430 perform some or all of the following:
   a. Confining traffic with in the appliance.
   b. Running various network and applications services for engaging with Bots.
   c. Event collection, transform and shipping module 415.
   d. Proxy module for engaging with C&C and other traffic communication for a real world interaction.
4. Events Collector and Storage Engine 435 may perform some or all of the following:
   a. This module is responsible for receiving some or all the events from various components running on the different GuestOS and Sinkhole VMs.
   b. Some or all of the events are stored in a database 445 for further analysis by the Multi-Dimension Correlation Engine.
   c. This includes log rotation, threshold-based cleanup and so on.
5. Multi-Dimension Correlation Engine (MDCE) 455 to correlate events for Bot detection. The MDCE may perform some or all of the following:
   a. This is a component for Bot detection, the engine responsible for correlating the event data and generating meaningful results for detection of Bots. It processes events from individual hosts and generates schemas, signatures, and alerts by means of correlation.
   b. Actions may be taken/driven based on the results of the correlation. Running the correlation may be event-driven and also may be run at regular intervals.
   c. The Bot detection rate is high since many individual events can be collected from the GuestOS and Sinkhole VMs.
   d. Exchanges information with higher-level MDCEs and other services in the corporate network and/or the Internet for global analytics.
   e. Taps into the cloud (Internet) for getting real-time information or metadata about BlackList IP address, URLs, virus signatures, social media and crowd-sourced information, and information from security devices and other sources.
6. Master Controller 460 performs some or all of:
   a. Running in the Privileged Mode, this software has total control over each of the GuestOS and Sinkhole VMs instantiated.
   b. Manages, creates and destroys VMs, bridges, and other resources.
   c. Monitors to ensure all the applications and services are running as necessary.
   d. Manages connectivity of VMs to each other and the network, for example, prevents outbound traffic from a GuestOS VM 420 from going out on a subnet interface 310, and redirects it as required to a Sinkhole VM 430.
7. UI for configuration and reporting 450
   a. Forwarding of alerts to other Security devices.
8. Additional security and monitoring services 470 may be used by MDCE 455, UI 450, Master Controller 460, and Event Collector 435.

FIG. 4 shows two GuestOS VMs 420, each of which may run one or more network services and applications such as FTP Server, Apache-based HTTP server, SSH server and so on. Any number of GuestOS VMs may be provided, subject to performance and other resource limitations. On each of the GuestOS VMs, there may be an Event Collector and Shipper 415 that collects events, logs them, and forwards them to the Event Collector and Storage Engine 435. Likewise, two Sinkhole VMs are shown, but any number may be provided to service outbound traffic from the GuestOS VMs 420. The Sinkhole VMs 430 may likewise include one or more web services and resources as the VMs 420 and may likewise include an event collector and shipper 415.

In FIG. 4, the bottom set of software modules 440 ("Master") may be running in Privileged Mode and have higher privileges configured by the Hypervisor 410, compared to the "Slave" GuestOS and sinkhole VMs that run in Unprivileged Mode. The Slave software modules may be off-the-shelf software such as standard releases of various operating systems, web services, applications, and utilities such as event loggers.

Software modules 4-8 listed above may run in a single VM, while in some embodiments they may advantageously be split among a plurality of VMs. As such, they are protected from any of the other VMs. These components may run in Privileged Mode, which means they have access to the Hypervisor 410 to create, destroy, and otherwise access, control and monitor VMs, bridges, and other resources, while in some embodiments the GuestOS of VMs 420 and Sinkhole 430 VMs cannot.

Some or all outbound traffic originating from any of the GuestOS VMs 420 may be either dropped or redirected to a Sinkhole VM 430, thus initially confining potential outbound traffic within the appliance, e.g. system 100. The Sinkhole VM may then allow selected traffic to be passed as is, modified or substituted and returned to the requester (such as a Bot 125) so that engagement may proceed in a harmless manner.

Multiple strategies and methods may be used to harden the Master software modules so that they do not get infected or become targets of an attack. Also, a GuestOS VM 420 being infected may advantageously have no impact on any of the other system components or other VMs, in terms of the CPU usage, resources, and so on, nor on the Master software modules.

Typical System Operation

Figure 5A:
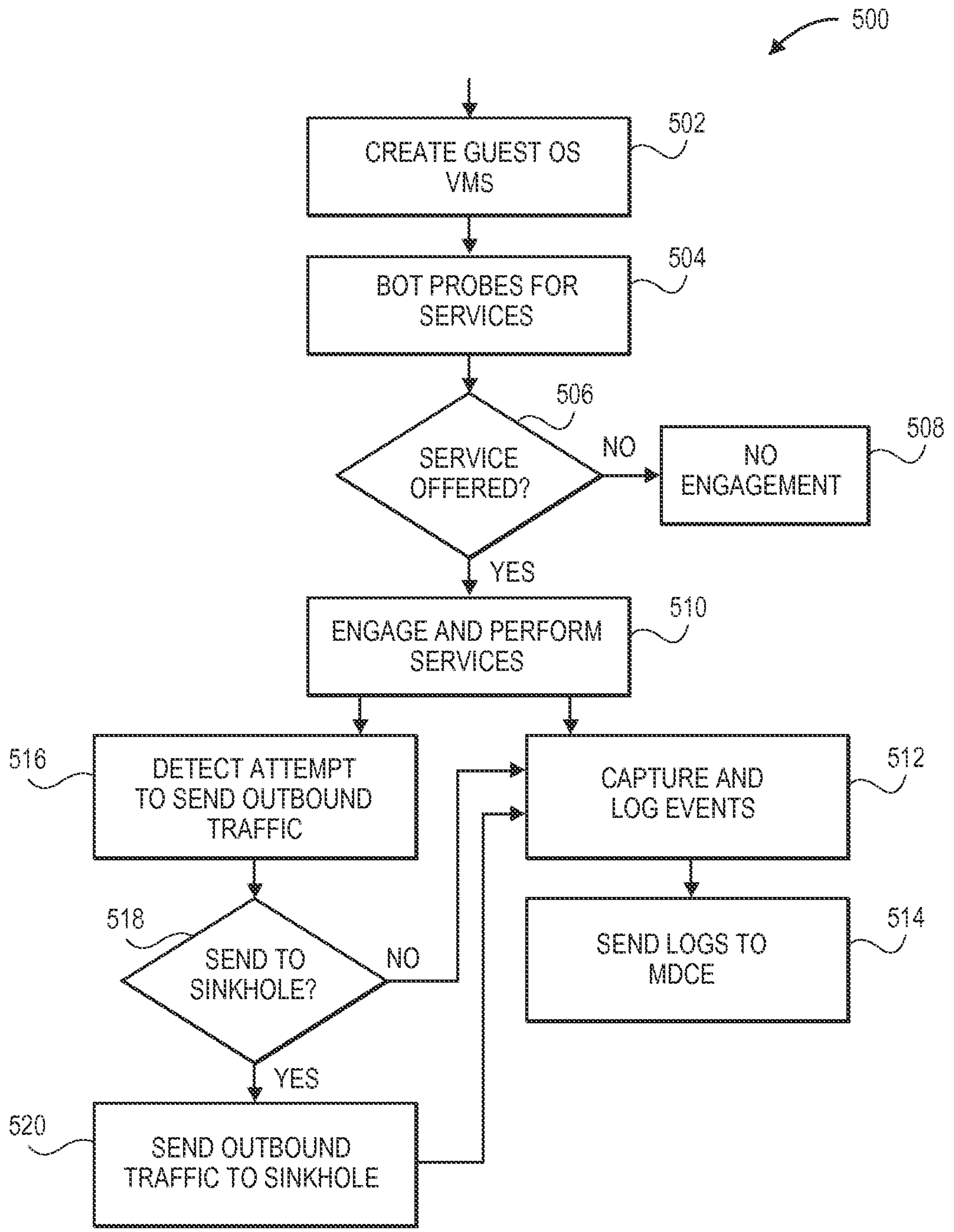
FIGS. 5A through 5C are process flow diagrams methods for responding to bots in accordance with an embodiment of the present invention.

FIG. 5A is a flowchart showing an example method 500 of operation of the BotMagnet 180 in a Bot Detection System 100 or BotSink appliance 300. In step 502, GuestOS VMs in the BotMagnet 180 are created and configured to offer various services, applications, and databases. In step 504, a Bot 125 is performing a port scan using the IP (internet protocol) address of one of the GuestOS VMs and is probing for services offered at that IP address. The Bot 125 may be located in the Internet 160, or it may be inside the corporate network 110, running on a server 170 or workstation 175 that has been infected.

In step 506, the Bot 125 is attempting to access the service at a particular port number. If the GuestOS VM does not offer 508 the service it logs the probe, but there is no engagement 508 with the Bot. Logging the probe is useful for automatically detecting port scans. If the service is offered, the Bot is allowed to engage with the GuestOS VM, and the service is performed in step 510. In this step, all of the communication and other activity normally associated with the service occurs.

A typical Bot, once engaged with a service or application on a victim system, looks for vulnerabilities that may allow it exploit the victim system, for example, by downloading, installing, and running an executable file. The executable file typically contains a program that may be able to initiate outbound traffic, and it may be a copy of the original Bot 125 itself, as the Bot attempts to spread itself laterally across the network. Thus, a copy of the Bot 125 may be running inside one or more GuestOS VMs in the BotMagnet 180, as was shown in FIG. 1.

During the engagement, agents in and associated with the GuestOS VM capture and log events in step 512. This step may be performed periodically, e.g. be substantially a continuous activity, that may take place in parallel with the normal activity of the service being performed in step 510. Periodically, or on the occurrence of particular events (such as the Bot attempting to send outbound traffic for the first time), in step 514 activity logs may be sent to the MDCE 185 for correlation with other events logged elsewhere.

During the engagement in step 510, the Bot may attempt to send various types of outbound traffic. One type may be an attempt by the Bot to contact its C&C facility 130. Another type may be an attempt to perform a port scan on other servers 170 and workstations 175 in the local network or beyond, and to infect any vulnerable ones that are found. Yet another type of outbound traffic may be an attempt to send files or other sensitive information (such as passwords, security keys, configuration information, and the like) to the C&C facility 130 or elsewhere.

In step 516, an attempt to send outbound traffic from the GuestOS VM is detected. Like step 512, step 516 is a periodic, e.g. substantially continuous activity, that may take place in parallel with the normal activity of the service being performed in step 510. Ensuring that outbound traffic is blocked or redirected may typically be a function of the Master Controller 460 software module running in Privileged Mode in the BotMagnet 180 or the BotSink 300. In step 518, a decision is made by such software whether to block such traffic or to redirect it to a Sinkhole VM in step 520. In either case, the activity is logged in step 512 for eventual sending to the MDCE in step 514.

When sending of outbound traffic is attempted for the first time in a particular GuestOS VM, the blocking and redirecting software may also be responsible for arranging to allocate or instantiate an associated Sinkhole VM and install and run the appropriate services and applications on it; in the present example this operation is performed by the Sinkhole itself, as will be seen next.

Figure 5B:
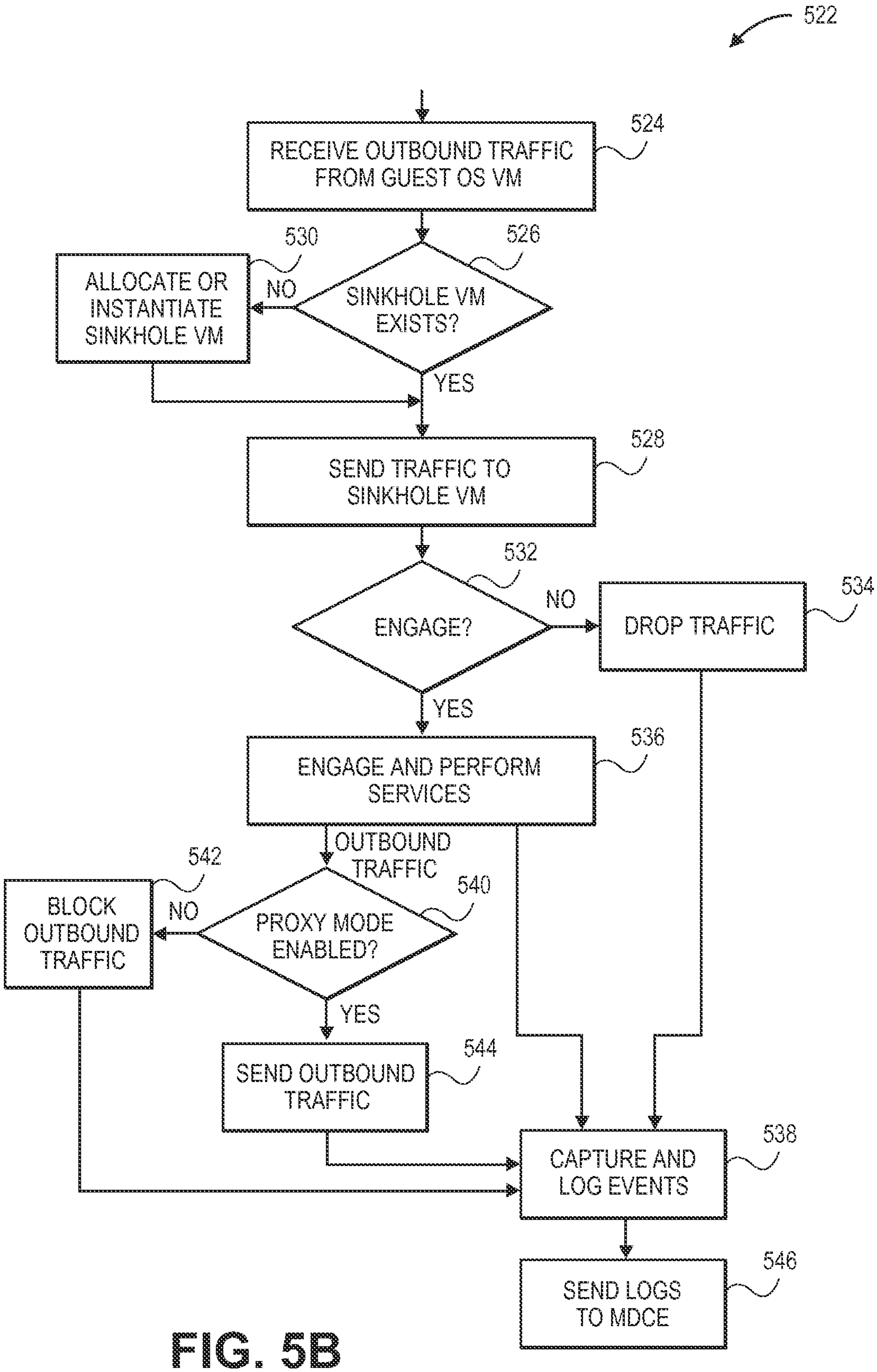

FIG. 5B is a flowchart illustrating an example method 522 of operation of the Sinkhole 190 in a Bot Detection System 100 or BotSink appliance 300. In step 524, the Sinkhole 190 receives outbound traffic from a particular GuestOS VM which has generated outbound traffic and has decided to send it to the Sinkhole 190 rather than drop it, for example in step 520 of FIG. 5A. In step 526, the Sinkhole 190 determines whether it already has a Sinkhole VM that is processing outbound traffic from the particular GuestOS VM and, if so, directs the traffic to that Sinkhole VM in step 528. If not, then in step 530 it either allocates a pre-configured Sinkhole VM from an available pool, or instantiates a new Sinkhole VM and configures it with the services and applications that may be needed for the new engagement. In particular, the outbound traffic may be inspected to determine a service or application referenced by the outbound traffic and that service or application may be provisioned on the Sinkhole VM. Once the Sinkhole VM exists and is ready to accept traffic, step 528 directs the outbound traffic to it.

In step 532, the Sinkhole VM decides whether to engage with the Bot 125. The decision whether to engage is based at least in part on the nature of the outbound traffic. If there is no engagement, then the traffic is dropped 534; otherwise it is forwarded to step 536 for engagement.

Whether or not engagement occurs, events and traffic may be captured and logged in step 538. The logging in step 538 is a continuous activity that takes place in parallel with the normal activity of any engagement being performed in step 536. Periodically, or on the occurrence of particular events (such as determining the name or address of the Bot's C&C facility 130 for the first time), activity logs may be sent to the MDCE 185 for correlation with other events logged elsewhere, e.g. events logged by a GuestOS for the Bot the same Bot that generated the traffic being processed by the Sinkhole VM according to the method 522.

Any kind of engagement may occur in step 536, if the Sinkhole VM is configured with the appropriate services and other software. For example, if the outbound traffic uses the HTTP protocol, the Sinkhole VM may host an Apache web server (e.g. provisioned on-the-fly to host an Apache web server) to respond to the Bot's web-page requests and serve up pages that may trap the Bot into continuing the engagement, giving the Bot detection system 100 more opportunities to learn about and log the Bot's behaviors and what it is ultimately looking for.

In another example, the outbound traffic may be a port scan that has been initiated by the Bot 125 in the GuestOS VM. In this case, the software in the Sinkhole 190 may ensure that all port scans are directed to one or more Sinkhole VMs, e.g. one or more other Sinkhole VMs, that offer various services and applications. Thus, the Bot 125 in the local GuestOS VM may be tricked into engaging with a service running on a Sinkhole VM. This provides more opportunities for the Bot Detection System 100 to observe and log the behavior of the Bot 125, such as according to the methods described herein.

In another example, if the outbound traffic uses the IRC (Internet Relay Chat) protocol, then it is likely to be an attempt by the Bot to communicate with its C&C facility 130. In this case, software in the Sinkhole VM may engage with the Bot using the IRC protocol and attempt to learn valuable information about the Bot. For example, it may be able to learn the URL (uniform resource locator) of C&C facility, or the identity of the Bot. If the outbound traffic includes a DNS request to learn the IP address associated with the C&C's URL, a DNS service in the Sinkhole VM may respond with the IP address of the Sinkhole VM itself, thereby fooling the Bot into communicating directly with the Sinkhole VM as if it were the C&C facility, further enhancing the Sinkhole VM's opportunity to learn and log more details of Bot-C&C interaction.

In yet another example, the Bot may be attempting to send in the outbound traffic corporate data that it accessed in the GuestOS VM. In such a case, the Sinkhole VM may simply maintain the HTTP, IRC, FTP, or other communication and data-transfer channel, and log the data that comes across it for further analysis, e.g. report the data to the MDCE 185 as described above.

In the examples above, the Sinkhole VM continues to prevent the original outbound traffic received from the GuestOS VM from leaving the confines of the Sinkhole 190. However, the Sinkhole VM may be configured to optionally enable a feature called Proxy Mode. When the Sinkhole VM attempts to send outbound traffic as a result of the engagement in step 536, step 540 determines whether Proxy Mode is enabled. If not, then the traffic is blocked in step 542 and logged in step 538. If Proxy Mode is enabled, the Sinkhole VM, with the cooperation of the Master Controller 460 software, may in step 544 allow the original outbound traffic received from the GuestOS VM to exit the Sinkhole 190. The Proxy Mode software may also modify the source IP address and other information in the outbound traffic so that further engagement occurs directly with the engaging software running on the Sinkhole VM, rather than with the GuestOS VM.

Proxy Mode may be especially useful if outbound traffic is determined to be an attempt by the Bot 125 to communicate with its C&C facility 130. Such traffic activity is monitored in step 538 along with other activities of the Bot. Thus, Proxy Mode may be particularly useful for "Bot research." That is, if the Bot Detection System 100 discovers a Bot whose behavior does not match any previously known Bot, network administrators or others may wish to investigate the Bot further to determine what additional exploits it may be capable of, and what kind of information or resource theft it is ultimately seeking By enabling Proxy Mode in a carefully controlled environment, the network administrators create the opportunity for Bot communication with the C&C facility 130, so that more information on the Bot and the C&C facility may be revealed. In Proxy Mode, it is also possible for the researchers to modify the outbound traffic to the C&C facility to reveal even more information. As for the method 5A, logs of events captured at step 538 may be sent 546 to the MDCE for processing according to the functionality ascribed to the MDCE 455 herein.

Figure 5C:
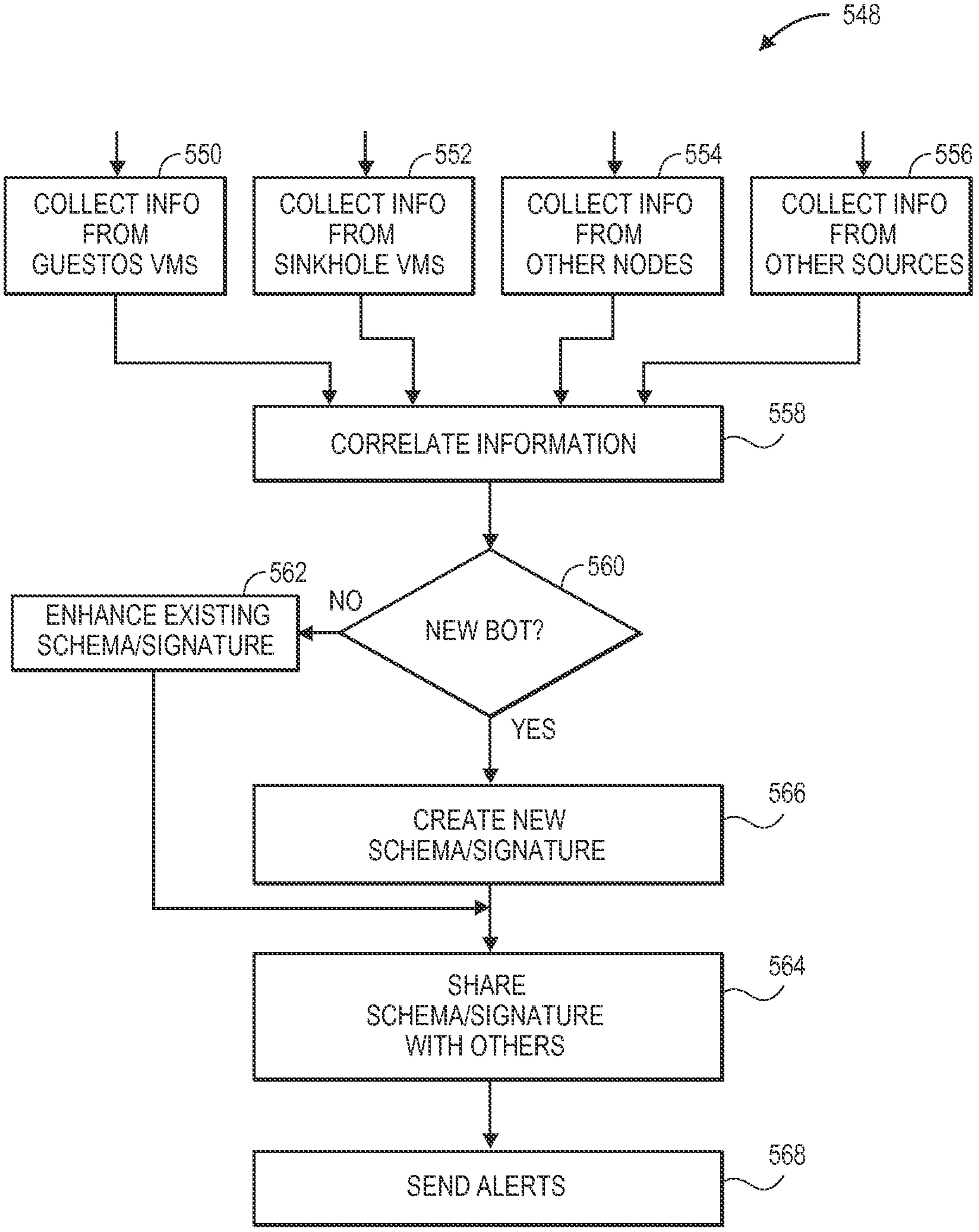

FIG. 5C is a flowchart illustrating an example method 548 of operation of the MDCE 185 in a Bot Detection System 100 or the MDCE 455 software module in a BotSink appliance 300. In step 550, the MDCE collects events and log information from one or more BotMagnets 180. Such information typically may be collected and consolidated from multiple GuestOS VMs and other software on each BotMagnet 180 by a software module such as the Event Collector and Shipper 435 that was described previously in connection with the Botsink 300.

Similarly, in step 552 the MDCE collects events and log information from the Sinkhole VMs and other software running in one or more Sinkholes 190. In step 554, the MDCE collects schemas/signatures and other information from other MDCEs 185, 187, and/or 188. In step 556, the MDCE collects schemas/signatures and other information from other Bot-information sources. Such sources may include publicly accessible services that collect and publish information on known Bots using software such as Snort and formats such as the STIX language to describe IOCs (Indicators of Compromise) and Bot signatures. Such sources may also include privately accessible services with which the operators of the Bot Detection System 100 have cooperation agreements.

In each case above, the events collected are placed into a database where they can be accessed by further steps. In step 558, the MDCE correlates information received from the various sources, to build and enhance Bot schemas/signatures. In particular, it correlates information from each particular GuestOS VM and the associated Sinkhole VM, if any, and determines which information may indicate the presence of a Bot and should be included in a corresponding schema/signature.

In step 560, the MDCE compares a new schema/signature with other schema/signatures in its database and determines whether it may correspond to a new Bot, e.g. a new type of Bot. The other schema/signatures may have been created as a result of other activity in the same Bot Detection System 100, or they may have been received from other MDCEs in step 554 or other sources in step 556.

If step 560 determines that the new schema/signature corresponds to an existing Bot, in step 562 the MDCE may combine the new schema/signature with the existing schema/signature(s) for the same Bot to create an enhanced signature, and update its database accordingly. In step 564, the MDCE may share the enhanced signature, if any, with other MDCEs and publicly and privately accessible Bot-information services.

If step 560 determines that the new schema/signature does not correspond to an existing Bot, in step 566 the MDCE may update its database with the new schema/signature and continue to step 564 to share the new signature with others. It may continue to step 564 immediately or, depending on MDCE configuration or characteristics of the Bot such as potential for damage, it may elect to wait until more activity or more instances of the Bot have been detected.

In step 564, the MDCE may share a new or enhanced schema/signature with Sinkholes 190. Having the ability to access the signatures of both new and previously known Bots may provide useful capabilities in Sinkholes 190. For example, a Sinkhole VM may decide whether or not to enable Proxy Mode or alert a research team depending on whether a Bot that it is engaged with is new or is already well known.

In step 564, the MDCE may also share a new or enhanced schema/signature with servers 170 and workstations 175 that are capable of interpreting such a signature and using it to block any attacks that should be directed at them. For any of the sharing partners above, the MDCE may share some or all of its schema/signature database with others periodically or upon other events, triggers, or requests, not just upon the creation of a new or enhanced schema/signature. In step 568, the MDCE may send alerts to a network administrator and/or others, indicating that a new Bot or an instance of a known one has been detected. If desired, such alerts may be sent earlier in the process, based on configuration or other characteristics of the detected activity, such as the potential for damage.

Schemas and Signatures

As introduced previously, a schema is a multi-element template for summarizing information, and a signature is a schema that is populated with a particular set of values. A schema may have just one or a few elements. However, an aspect of the invention is to base Bot detection not just on one or a few individual events like network behavior or signature but across multiple dimensions across various VMs, services, and applications across multiple subnets. Thus, the schema for describing a particular Bot may have many elements corresponding to the many dimensions, and the values that populate the elements may capture the behaviors of many instances of the Bot. The populated schema may be called a "Multi-Dimension Bot Lifecycle Signature."

These multiple dimensions can be broadly categorized into, but not limited to, the following:

1. Network activity
   a. Transmit packets
   b. Receive packets
2. Connection tracking
   a. Inbound
   b. Outbound
3. Probes/scans
   a. ARP request/ARP response
   b. TCP SYN, TCP Reset, ICMP redirects and so on
4. Network behavior
   a. Time of activity
   b. Burstiness
   c. Amount of data transferred
5. OS related activity
   a. OS system calls
   b. Call stack
   c. Delay or sleep
6. System activity
   a. Registry key changes
   b. Installation of other programs
   c. File drops
   d. Directory creation
7. Application activity
   a. Authentication (involves audit logs)
   b. Usage of resources
8. Application-related backend activity
   a. Database access
   b. Invoking other utilities and programs
9. Log activity
   a. Log file
   b. Utilities like Firewall, iptables, other security programs, antivirus, and so on
   c. Events detected and reported by other security programs
   d. Snort (intrusion detection and prevention system)
   e. Generate new signature both for C&C as well for the traffic generated by the Bots. These signatures can be exported and shared among security devices.

Such activities may be captured on either of the GuestOS VMs and Sinkhole VMs on which they occur or by which they are detected. In some cases, the capturing is accomplished by small agents that are installed with the GuestOS or Sinkhole software, typically monitoring calls to the OS kernel for various services. How to create and install such agents is understood by those skilled in the art. For example, among other things the Linux Audit System has the ability to watch file accesses and monitor system calls (c.opensuse.org/products/draft/SLES/SLES-security_sd_draft/cha.audit.comp.html, Chapter 30, Understanding Linux Audit).

In general, monitored activities may include any of the following:

1. file access
2. file modification
3. file transfers (incoming or outgoing)
4. directory creation/destruction
5. registry queries & modifications
6. new-process creation
7. process destruction
8. input/output, including use of cameras and other peripherals
9. keystroke and mouse capture/logging
10. display activity
11. installation or removal of agents An example of a schema written in XML is shown in FIGS. 6A and 6B. For the purposes of illustration, this schema has been limited to a few dimensions and has correspondingly few elements. However, the number of and complexity of the elements may be expanded to describe any desired number of Bot lifecycle behavioral dimensions. The elements of the example schema are described in the paragraphs that follow.

The first nine lines of the example schema in FIGS. 6A and B contain identifying information about the schema itself, such as the name, description, creation date, and author of the schema. The definition of the schema begins at line 10.

On line 11, the "OR" operator specifies that matching any of the elements within its scope creates a match of the schema. Other operations such as "AND" can be used, and logical conditions can be nested as desired. The "id" and its value are for identification and tracking purposes and are placed in the schema by its author, the MDCE in the present example.

The first element within the "OR" operator's scope is specified on lines 12-15. This element matches a file whose name matches the string value "fsmgmtio32.msc", which in this schema is the name of a file that may have been accessed or installed by a Bot.

The next element is specified on lines 16-19, and matches a file whose MD5 checksum equals a specified value. Thus, if the Bot installs the same malicious file in different victims, it will still be matched even if a different filename is used. Or, additional elements could be added to the schema to specify additional variations of filename or MD5 checksum in different instances of the Bot.

The next two elements, on lines 20-23 and 24-27, match a DNS lookup for either of two URLs that may correspond to a C&C facility for the Bot. The element on lines 28-31 matches a particular remote IP address that may be associated with the Bot.

The example schema's list of elements continues in this manner, with each element specifying a value to be matched. The element on lines 60-68 is worth pointing out, as it matches an event detected by SNORT software running in the Master, privileged layer of software in a BotMagnet 180, Sinkhole 190, or BotSink 300. The element on lines 69-86 is also worth mentioning, as it is "composite" element involving several values and two logical operations, designed to match a Microsoft Windows registry entry. The registry-item path must match "Software\Microsoft\Windows\CurrentVersion\Run", AND the registry-item value must match "\WindowsNT\svchost.exe" OR "\WindowsNT\svclogon.exe".

The event and the value to be matched in each element may have been logged originally by a GuestOS VM 420, a Sinkhole VM 430, or in some cases by other software modules running on the BotMagnet 180, Sinkhole 190, or BotSink 300. In any case, it is the responsibility of the MDCE 185, 187, or 188 to determine which events may be relevant to a particular Bot and to incorporate appropriate matching elements as it builds or augments the corresponding schema and the values that are matched, thus creating a multi-dimension lifecycle signature for the Bot.

Multi-Dimension Correlation Engine Details

As previously explained, one component of the Bot-Detection System 100 is the multi-dimension Correlation Engine (MDCE) 185, 455. One function of the MDCE may be to correlate multi-dimension individual events collected across various modules across different VMs to generate a multi-dimension schema and signature corresponding to a Bot 125. That is, the MDCE observes Bot behavior and thereby generates a "Bot Lifecycle Signature" using a schema. The MDCE 185, 455 can import various signatures/schemas from other MDCEs 185, 187, and 188 and from the cloud, as well as transform these schemas for export in various standard formats. The MDCE can reduce false positives by dynamic learning and incorporating other information like white lists and so on.

The MDCE can classify as well as group the events according to the type of Bot infection phases such as those described in the section on Lifecycle of Bot Detection.

The MDCE supports importing of data related to one or more Bots from multiple sources and formats as well feed this data to the MDCE, resulting in better detection. Similarly, Bot related data like signatures, traffic, events, pcap (packet capture) and so on can be transformed into various formats for exporting to other systems. Some of the input/output formats supported are listed below:

1. Open Framework for Sharing Threat Intelligence (OpenIOC) format
2. Structured Threat Information eXpression (STIX) format
3. SNORT rules/signatures
4. other industry-standard formats that may exist or be developed
5. customized and proprietary formats Actions Taken on Bot Detection On detection of any infection on any of the Guest OS VMs 420 based on the collection of data and events, the Master Controller 460 software module running in Privileged Mode in the BotMagnet 180 is responsible for taking a set of actions on that particular VM without any user involvement. The list of possible actions includes:

1. Stop the service
2. Cleanup by running different Antivirus utilities
3. Destroy the VM
4. Respin the VM
5. Quarantine the VM for further observation
6. Wait for a predefined timeout value, or as configured by user, and then respin the VM.

In any of these cases any outbound traffic from the infected GuestOS VM 420 may always be dropped by the GuestOS VM or it may be redirected to a SinkHole VM 430 which may send it, may modify and then send it, or may drop it, as was explained previously in connection with FIG. 5B. Hence there may advantageously be no leakage of any outbound traffic from any of the VMs on the BotSink appliance 300.

A Bot's behavior may be similar to one that has been seen before, either by the local MDCE 185, by another MDCE 185, 187, or 188, or by another security service that has shared Bot signatures using a known format. In such a case, the MDCE that has detected the Bot may export the locally constructed signature to these other devices and services to enhance global recognition of the Bot. If the Bot is not recognized—a so-called Day Zero attack—the MDCE may advantageously share the locally constructed signature with other devices and services.

In either case, signatures shared with other MDCEs, devices and services may characterize Bot behavior in much more detail because of unique capability of the Bot-detection system 100 to capture very detailed behavioral information from multiple sources over the entire lifetime of the Bot.

Lifecycle of Bot detection

This section describes a sample Bot and gives details right from the infection phase to the Command & Control (C&C) communication phase. The lifecycle of a Bot infection process may be classified into five stages, called "Bot infection phases":

1. E1—Inbound scanning—scanning a computer within the network.
2. E2—Exploit—when the inbound scan successfully exploits/gains access to use a computer within the network using various exploit attack vectors.
3. E3—Egg download—downloading a copy of the complete Bot to infect and execute on the exploited computer.
4. E4—Outbound scanning—Infected machine within the network scans machines inside or outside the corporate network for vulnerabilities for infecting more systems.
5. E5—C&C engagement—infected machine contacting the command and control center. (Note: this extract is adapted from http://rise.cse.iitm.ac.in/wiki/images/9/98/Botnet_report.pdf).

The above list of phases may be extended by adding two or more phases, such as:

1. E6—Infection Phase resulting in payload drop onto a new target.
2. E7—Malicious Traffic generation like generating SPAM, DDOS, etc.

On the other hand, it is entirely possible that some Bots may skip a few phases and may execute the phases in a different order. Also some events, like E4 and E5, can happen independently of each other.

This section details and lists multi-dimension events, their processing and their grouping, which results in detection of the sample Bot by the BotSink system 100 or appliance 300. This also includes the subsequent generation of alerts and target client list reporting. The events listed here may be specific to the Botsink system 100 or appliance 300 implementation and follow a generic format used to log each of the events, as shown below:

1. Time Stamp Field: Indicates the timestamp, such as in UTC format, of when this event was captured
2. Event Name: describes the type of event or a module name responsible for this event.
3. Type: subtype of the event, like request/response
4. Protocol: The transport protocol such as TCP, UDP etc.
5. Flags: Protocol specific information.
6. L2: MAC-layer specific information, like MAC address
7. L3 info: IP addresses of both source and destination, and whether IPv4 or IPv6
8. L4 info: port number of source and destination, service info
9. Extended description: Raw or summary description related to event Two examples of events are:

1. <TimeStamp=1222,Event=ARP, type=request, src Ip=123.2.1.3, mac=mm:aa:bb:cc:dd:ee:> (where ARP means Address Resolution Protocol).
2. <TimeStamp=225,Event=Network, Type=TCP, sub-type=connection established (Event 023, conn established, client IP=x.x.x.x, destination port=yy, target ip, port etc.) (where TCP is transmission control protocol).

Sample Trace for Bot called BBB

A Bot installed on a workstation or server initiates a port scan thereby probing to discover new computers for infection to laterally spread itself. The BotSink appliance engages with the Bot by responding to all probes that arrive at each of the GuestOS VMs that it hosts. It also logs these probes. The following set of events are triggered:

1. <TimeStamp=1222,Event=ARP, type=request, Ip=x.x.x.x, mac=mm:aa:bb:cc:dd:ee:>
2. <TimeStamp=1223,Event=ARP, type=response, ip=x.x.x.x, mac=mm:aa:bb:cc:dd:ee:>
3. <TimeStamp=224,Event=Network, Type=TCP, Protocol=TCP, Flags=SYN, srcip="x.x.x.x", srcport=mm", destport="aa", destination ip=y.y.y.y">
4. <TimeStamp=225,Event=Network, Type=TCP, sub-type=connection established (Event 023, conn established, client IP=x.x.x.x, destination port=yy, target ip, port etc..).

Based on the response, the Bot determines or further probes to determine a set of services enabled on each of the GuestOS VMs. Bots usually probe some of the set of ports that host standard services, that is, one or more standard, well-known ports looking for services like SMTP, IIS server, HTTP/S, FTP and so on.

The Bot tries to exploit a particular service by running a set of known vulnerabilities against that service. If successful, the Bot tries to take control of the target host by setting up a backdoor by means of a payload drop. The payload is usually an executable program intended to take control of the target. The exploit of this vulnerability as well the payload drop result in generation of the following set of events. In this example the Bot is using a password cracking mechanism for the initial attack vector, and then drops in a payload called mmm.exe.

1. <TimeStamp=2222,"Event"="Network, 026", Type=login,027>
2. <TimeStamp=2223,"Event"="Authentication,31", username=028, password=028, authentication status=success 029>
3. <TimeStamp=2224,"Event"="Network", EventId=024, data size= 453 bytes, Event 044, file name=mmm.exe>
4. <TimeStamp=2225,Event="Audit", Audit=file created, permission=xxx, file size=453, file-owner=root, srcip="x.x.x.x">
5. <TimeStamp=2226,Event="APP", AppType=FTP, srcip="x.x.x.x">
6. < TimeStamp=2227"Event"="OS", Event Id=061, "Type"= "File Store", "File Permission"="execute permission on file")
7. < TimeStamp=2228,Event=OS", Type=Exection,mmm.exe:>
8. Snort captures all connection establishments and logs them. Individul network services or applications like FTP and HTTP will log each of the events in/var/log/xxx.
9. < TimeStamp=3222,Event="APP", AppType=FTP, srcip="x.x.x.x">
10. < TimeStamp=3223,Event="APP", AppType=FTP__filedrop, srcip="x.x.x.x">
11. < TimeStamp=3224,Event="OS", AppType=file stored, srcip="x.x.x.x">
12. Some or all events are tracked/monitored as being executed by the Bot.
13. < TimeStamp=4222,Event="Audit", AuditType=directory created, srcip="x.x.x.x">
14. < TimeStamp=4223,Event="OS", command=mkdir, srcip="x.x.x.x">
15. < TimeStamp=4224,Event="OS", AppType=file stored, srcip="x.x.x.x">

The Event Collector and Shipper 415 module transforms these as well as other events into a fixed format and sends them off to the Event Collector and Storage Engine 435. It may add relevant information like a host name and the like.

The Event Collector and Storage Engine 435 running in the Privileged Mode may collect some or all events from different VMs hosting different GuestOS and feed them to MDCE 185.

The MCDE may correlate all these individual multi-dimension events, possibly in real-time, to generate one summary alert. The summary alert will be provided to the network administrator with some or all the critical information need to identify the Bot and the infected-targets list. The UI module will provide the network administrator the ability to query all the associated individual events that led to the raising of the summary alert and all other associated data collected as part of individual events.

For Example: <Event=Alert, Priority=1, Severity=1, Description="Bot BBB detected", Client IP List="x.x.x.y", "x.x.x.x", file drop name=mmm.exe, protocol=tcp, app=ftp, Related BotInfectionPhaseTransition:Timestamp1:E1, TimeStamp2:E2, TimeStamp3:E3, TimeStamp4:E4, Events=011,0222,233,233,343,234,543,2323,>

Some or all individual events that can be generated by the VMs may be mapped to one or more "Bot Infection Phase" numbers. Based on the "Bot Infection Phase" number it is possible to track what phase a particular Bot infection is in and monitor its progress. The "Bot Infection Phase" number transition and the associated individual events are unique for each of the Bots and hence can be used to create a "Bot Lifecycle Phases Signature":

1. <scan phase=011, 022, 033>
2. <exploit phase=034, 0455>
3. <payload drop phase=0352, 0459>
4. <outbound scan phase=03498, 045522>
5. <c&c phase=02323,2988,88772>
6. <infect others phase=023343,54343>
7. <exploit traffic generation=0877,0982>

Example of BotInfectionPhaseTransition for Bot BBB may include:

1. Timestamp1:E1
2. TimeStamp2:E2
3. TimeStamp3:E3
4. TimeStamp4:E4,
5. Events=011,0222,233,233,343,234,543,2323

This "Bot Lifecycle Phases Signature" can be shared with other MDCEs, security components, end points, IPS (intrusion prevention system) devices and so on and helps them to quickly identify behaviors seen on those systems as corresponding to Bot activity or not. Based on this information, the Bot can be quickly terminated and threat mitigated, for example, by quarantining devices whose event logs contain events matching the Bot's now-known behavior. It is also possible to safeguard private data at the network level by configuring filters on Internet-connected routers to block all outbound traffic destined for the C&C facility's now known address.

Figure 7:
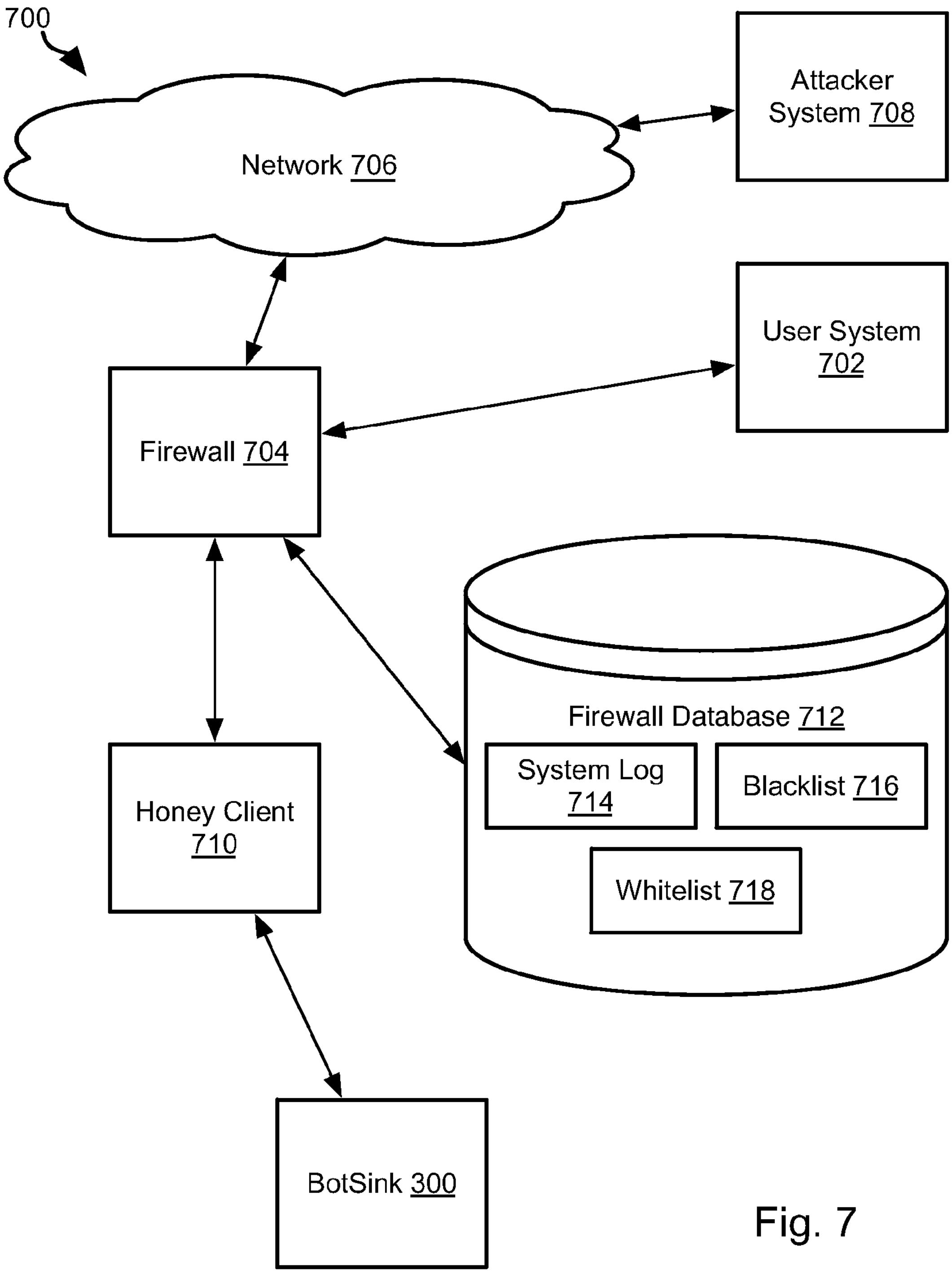
FIG. 7 is a schematic block diagram of an environment implementing methods in accordance with an embodiment of the present invention.

Some or all other security appliance/components existing in a network can be configured to drop and/or quarantine any traffic originating from any of the IP addresses that have been assigned to the BotSink Appliance 300. In some embodiments, a signature or schema generated according to the methods described hereinabove may be formatted and contain some or all of the types of data in the example schema shown in FIGS. 6A and 6B. An understanding of the context in which the novel methods described herein may be applied can be found in the following articles, which are hereby incorporated herein by reference as constituted on May 2, 2014:

https://www.gosquared.com/blog/how-to-stop-a-botnet-attack http://www.darkreading.com/risk/up-to-9-percent-of-machines-in-an-enterprise-are-bot-infected/d/d-id/1132015?

http://rise.cse.iitm.ac.in/wiki/images/9/98/Botnet_report.pdf http://www.cms.livjm.ac.uk/pgnet2012/Proceedings/Papers/1569604821.pdf Referring to FIG. 7, the illustrated environment 700 may be used to evaluate URLs (uniform resource locators) to determine whether they link to malicious content, such as a Bot as described above or some other type of invasive or harmful content. The environment 700 may include a user system 702 that uses a firewall 704 to access an external network. As known in the art a firewall 704 is a software or hardware component that evaluates incoming data to determine whether it is likely to be harmful to a computer system or network. The firewall 704 is further operable to block data from being transmitted to a computer system or internal network if deemed harmful.

For example, a URL requested by the user system 702 may point to a resource that is hosted by an attacker system 708. The attacker system 708 may be owned or controlled by an entity wishing to gain unauthorized access or cause harm or may simply be a computer system coopted by a Bot or some other malicious code in order to carry out attacks, such as any of the attacks described herein.

The firewall 704 may cooperate with a honey client 710 and a BotSink appliance 300, which may also be replaced with the BotSink system described herein. In some embodiments, an intervening network may be positioned between the honey client 710 and the BotSink 300. For example, the honey client 710 may be a separate device from the rest of an enterprise network. In some embodiments, the honey client 710 only has access to or any visibility of the BotSink 300 and the simulated network defined thereby. The honey client 710 may have no visibility of an enterprise network protected by the firewall 704 and its connection to the firewall 704 may be limited to communications described according to the methods of FIGS. 8-10 described below. The firewall 704 may access a firewall database 712 that records such information as a system log 714 that reports network activity transmitted through the firewall 704. The system log 714 may advantageously store URLs requested by user systems 702 or otherwise identified as the source of content requested from the external network 706 or received from the external network 706 by the firewall 704. The firewall database 712 may further include one or both of a blacklist 716 and a whitelist 718. The blacklist 716 may list URLs that are known to reference malicious content, files that are known to contain malicious code, signatures of files that are known to contain malicious content, or other identifiers of content that is known to be harmful. A whitelist 718 may identify addresses and content that are known to be benign.

Figure 8:
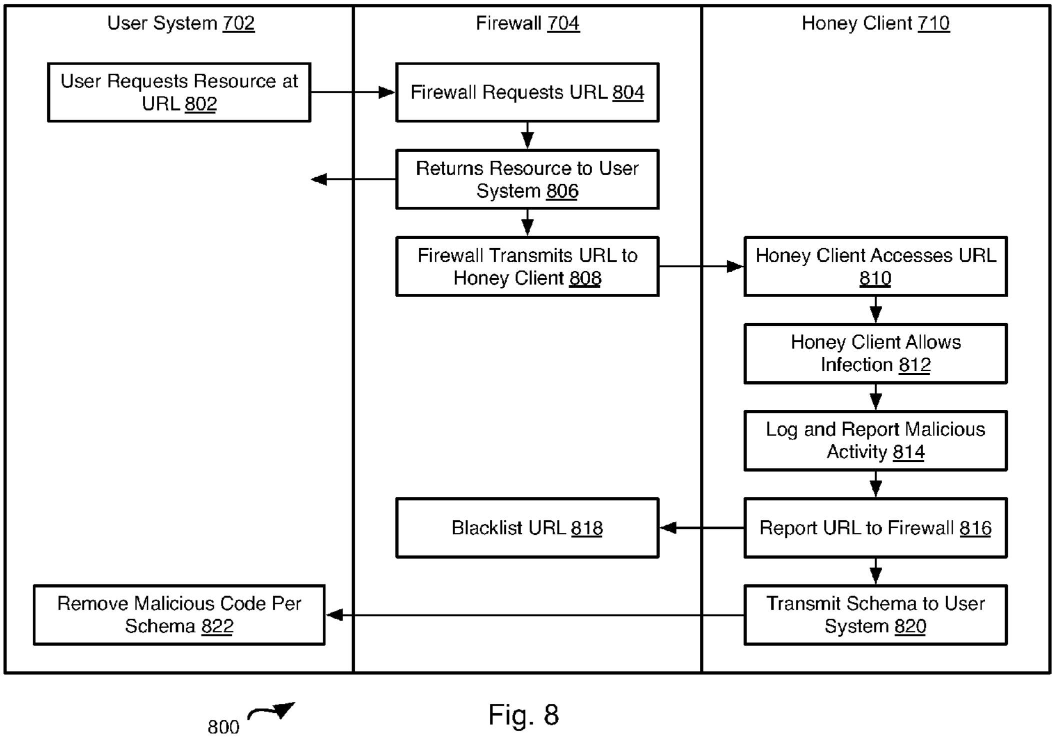
FIG. 8 is a process flow diagram of a method for evaluating URLs in accordance with an embodiment of the present invention.

FIG. 8 illustrates a method 800 for evaluating URLs. The illustrated shows steps as being performed by a particular system (user system 702, firewall 704, and honey client 710). For purposes of this application, the functions attributes to each of these systems may all be performed on the same computer system, e.g. the same physical computing device, or on separate computer systems. Likewise, the functions described herein as being performed by a single system 702, 704, 710 may be performed by a combination of two or more computer systems. In some embodiment, some or all of the systems 702, 704, 710 may be embodied as one or more virtual machines on the same or different computing systems performing the functions attributed thereto.

The method 800 may include sending 802 by the user system 702 a request for a resource located at a URL ("the requested URL"). The request is received by the firewall 704, which requests 804 a resource (e.g. web page, file, etc.) at the requested URL and returns 806 the resource to the user system. The firewall transmits 808 the requested URL to the honey client 710. Transmitting 808 the requested URL may be performed as URLs are received, e.g. within 0 to 1 s. of receipt. In other embodiments, transmitting 808 the requested URL may include periodically transmitting the latest entries of a log (e.g. system log 714) of received URLs to the honey client 710, such as in response to periodic requests for this log by the honey client 710. The firewall 710 may be configured to send URLs to the honey client 710, i.e. the honey client 710 may be specified in the configuration of the firewall 710 as the syslog server for the firewall 710. Alternatively, the firewall 710 may also store URLs in some other syslog server, in which case honey client 710 may be configured with the syslog server details and probe the syslog server periodically to get new URLs for processing according to the methods disclosed herein.

The honey client 710 may then access 810 the requested URL. For example, the honey client 710 may be configured as a BotMagnet 180 with one or more VMs executing one or more GuestOSs. Accordingly, the honey client 710 may invoke accessing 810 of the requested URL by a GuestOS, such as by a browser or other application executing within the GuestOS.

As described above with respect to the GuestOS of a BotMagnet, infection may be allowed 812 by the honey client 710. For example, by accessing the URL, an attacker system 708 may be informed of a port from which the URL was accessed and exploit the port as described above. The URL may reference a web page, file, application, or other data that contains malicious code. Accordingly, upon accessing the resource, infection by malicious code may occur according to any manner. Malicious activity occurring on the honey client 710, such as within the VM and/or Guest OS may be logged and reported in the same manner as described above with respect to the BotMagnet and Sinkhole. In particular, the events logged and reported may include some or all of the events described as being logged and reported above. The events may be reported to an MDCE and used to detect and prevent exploitation of other networks and computer systems in the same manner as described above.

If malicious activity is detected, the requested URL may be reported 816 to the firewall 704 which may then blacklist the URL 818, i.e. add it to a blacklist 716 of URLs known to result in exploitation of requesting computer systems. In some embodiments, the honey client 710 or MDCE may generate a schema that describes the actions and attributes of malicious code infecting the honey client in response to accessing the requested URL. This schema may have some or all of the attributes of the schema of FIGS. 6A and 6B. The manner in which a schema is generated may be the same as for the other embodiments described hereinabove. The schema may then be used by the user system 702 to remove 822 malicious code from the user system 702.

Figure 9:
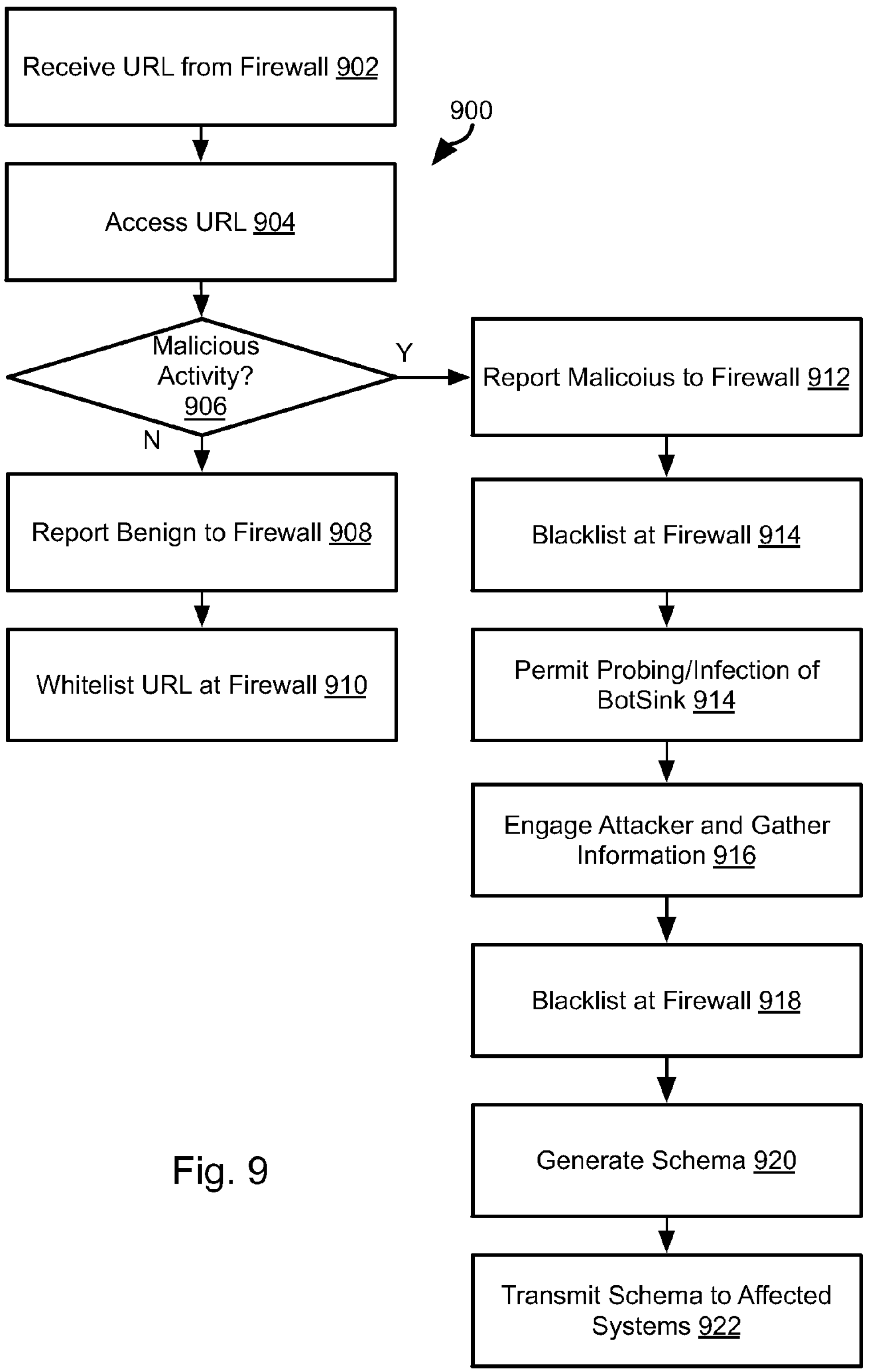
FIG. 9 is another process flow diagram of a method for evaluating URLs in accordance with an embodiment of the present invention.

FIG. 9 illustrates a method 900 of evaluating URLs that expands on the steps illustrated in FIG. 8. In particular, the method 900 may include receiving by the honey client 710 a URL from the firewall 704 and access 904 the URL, such as within a VM and/or GuestOS as described above. If no malicious activity is found 906, the URL may be reported 908 by the honey client 710 as being benign. Whether a URL results in malicious activity may be determined after providing sufficient time for such activity to occur, such as zero to one seconds, one or more minutes, one or more hours, one or more days, or some other period. The firewall 704 may then add the URL to a whitelist 718. In some embodiments, subsequent requests for a whitelisted URL will not be reported to the honey client 710 for evaluation.

If a URL is found to result in malicious activity by the honey client 710, then the URL may be processed in the same manner as for the method 800 of FIG. 8. The honey client 710 may send events to an MDCE and the MDCE may analyze the events to determine that they in fact indicate malicious activity. To detect stealth bots/APTs (advanced persistent attacks) that are looking for network targets, the honey client 710 may be permitted to probe and look for targets at the URL or domain referenced by the URL.

The honey client 710 may further permit 914 probing and infection of the honey client 710. In some embodiments, the honey client 710 prevents outbound traffic in order to avoid spreading malicious code or allowing exploitation of other networks or computer systems The honey client 710 can be deployed in isolated network/VLAN. It can communicate only with an external network (e.g. the Internet) and to the BotSink 300. The honey client 710 and BotSink 300 together form a virtual network in which malware can execute and operate in isolated environment. In some embodiments, the honey client 710 may direct outbound traffic to a BotMagnet and/or Sinkhole as described above. Each honey client 710 may be mapped to a specific BotSink 300 in implementations where multiple honey clients 710 and BotSinks 300 are implemented. For example, files shared by the honey client 710 may be mapped to the specific BotSink 300 to which it is mapped. The honey client 710 may knowledge of a customer network from its corresponding BotSink 300. The honey client 710 may host a proxy VM which redirects traffic originated towards customer network or internal private network (Ex: 172.16.0.0/12, 192.168.0.0/16, 10.0.0.0/8) towards its corresponding BotSink 300. The BotSink and Sinkhole may then engage 916 malicious code executing in the honey client 710 or remote attacker systems 708 in the same manner as described hereinabove. As noted above, some or all of the BotSink, Sinkhole, MDCE, and other components may be implemented by a single BotSink Appliance 300. In some embodiments, the functionality of the honey client 710 may also be implemented by the BotSink Appliance 300.

The method 900 may include engaging 916 an attacker system 708 and malicious code executing on some or all of the honey client 710, BotMagnet, and SinkHole. Where accessing a URL results in detecting malicious activity in some or all of the honey client 710, BotMagnet, and Sinkhole, the honey client or other component may transmit notification of the URL being malicious to the firewall 704, which may then blacklist 918 the URL in response to this notification.

Using events occurring during this engagement at step 918, a schema may be generated 920 that describes the exploitive activity and code resulting from the requested URL. For example, events detected by some or all of the honey client 710, BotMagnet, and SinkHole may be reported to an MDCE which then generates 920 a schema as described hereinabove.

The schema may then be transmitted 922 to one or more systems in a network. The schema may be transmitted to these systems, which then use it to preemptively detect attacks that conform to the schema. Systems that receive the schema may also use the schema to detect the presence of malicious code on the systems prior to receiving the schema. These systems may then use the schema to remove the malicious code and or detect what exploitation may have occurred.

Figure 10:
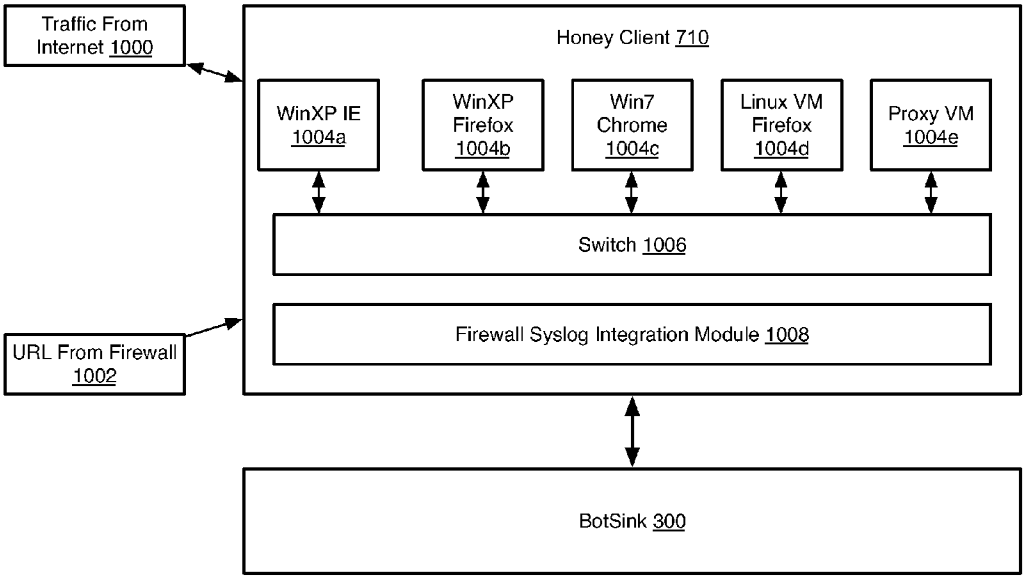
FIG. 10 is a schematic block diagram of a honey client in accordance with an embodiment of the present invention.

FIG. 10 is a schematic block diagram of components that may be executed on a honey client 710. In particular, the honey client 710 may receive traffic 1000 from the Internet or some other external network (e.g. not protected by the firewall 704). The honey client 710 likewise receives reports of URLs 1002 from the firewall 704. The honey client 710 may host a plurality of browser and operating system scenarios 1004*a*-1004*e*. For example, browsers such as INTERNET EXPLORIER, FIREFOX, CHROME, OPERA, SAFARI, and the like may be hosted on one or more operating systems such as WINDOWS XP, WINDOWS 7, WINDOWS 8, MAC OS X, LINUX, UNIX, and any other operating system. For example, a plurality of GuestOSs may be instances of a plurality of different operating systems and each GuestOS may have instances of one or more different types of browsers and/or other web services executing thereon. In some embodiments, the Proxy VM 1004*e* hosts an HTTP (hypertext transfer protocol)/SSL (secure socket layer) Proxy may be programmed to act as a “man-in-middle” to track all outbound activity from the honey client 710 generated by any of the other scenarios 1004*a*-1004*d*.

The honey client 710 may include a switch 1006 that routes received URLs to a plurality of different scenarios 1004*a*-1004*e*. The resource at the requested URL may be retrieved in each scenario 1004*a*-1004*e* and any exploitive activity that occurs in response may be allowed to occur and recorded as described hereinabove. In some embodiments, the switch 1006 may have data describing a customer network and redirect NAT (network address translation) traffic originating from the honey client 710 towards a simulated customer network defined by the BotSink 300. As shown in FIG. 10, the BotSink 300 may be integrated with the honey client 710. In particular, the BotSink 300 which enables malicious code to access the IP addresses, subnets, and VLANs configured in the BotSink 300.

The honey client 710 may further include a firewall integration module 1008. Many firewalls 704 provide an interface used to retrieve logs and other operational data from the firewall. Accordingly, the firewall integration module 1008 may implement an API (application programming interface) for the firewall 704 that receives or retrieves the URLs requested from the firewall 704 by one or more user systems 702.

Figure 11:
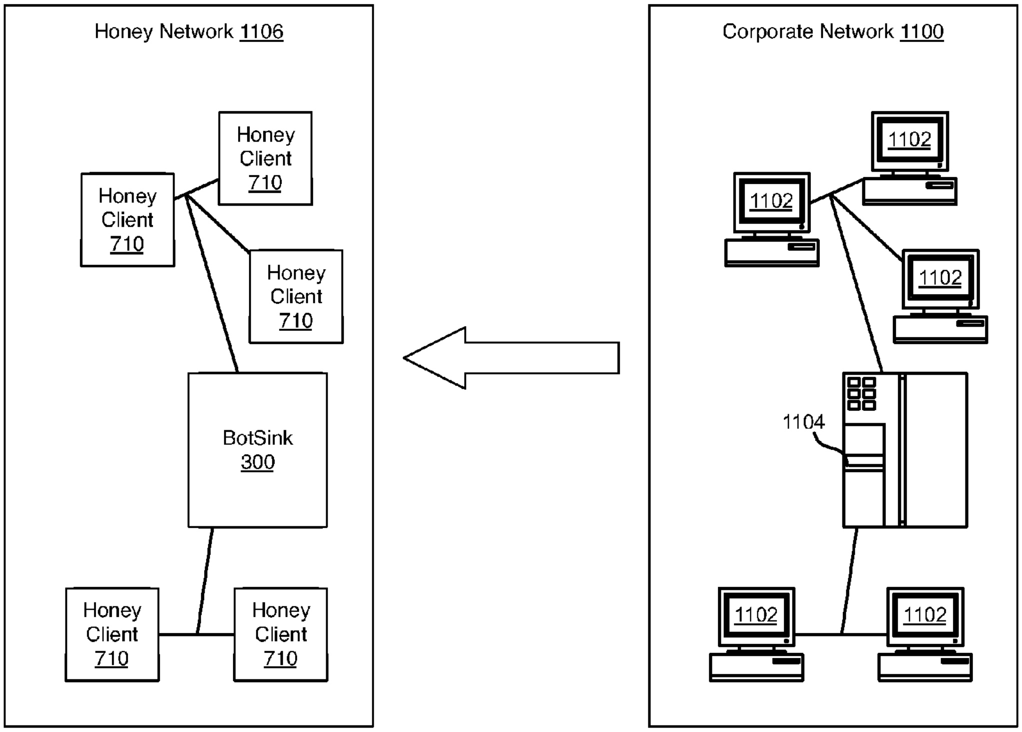
FIG. 11 is a schematic block diagram of a honey network mirroring a corporate network in accordance with an embodiment of the present invention.

Referring to FIG. 11, a corporate network 1100 may include a plurality of workstations 1102 and servers 1104. The network 1100 may include any topology of networks and sub-networks. The workstations 1102 may include laptop or desktop computers, mobile computing devices, or other computing device. Each workstation 1102 may implement one or more scenarios (combination of operating system and browser) and may implement one or more network applications. Likewise, the one or more servers 1104 may implement one or more network services.

A BotSink 300, or some other module implemented by a computer system, may probe the corporate network 1100 and discover the network topology, including the one or more server systems 1104 and the services offered by the one or more server systems. Likewise, a computer system implementing one or more honey clients 710, or some other module implemented by a computer system, may discover the workstations 1102 as well as network connections between workstations 1102 and between the workstations 1102 and the one or more server systems 1104.

In response to discovering the topology of the corporate network 1100, one or more BotSinks 300 may be instantiated and one or more honey clients 710 may be instantiated. In particular, a honey client 710 may be instantiated for each of some or all of the discovered workstations 1102 and a BotSink 300 may be instantiated for each of some or all of the server systems 1104. Bridges between virtual machines implementing the honey clients 710 and BotSinks 300 implemented on the same computer system may be defined in order to mimic the connections between corresponding workstations and server systems 1104 of the corporate network. Likewise, network connections among honey clients 710 and BotSinks 300 may be defined where these are implemented on separate computer systems. Each honey client 710 may be configured with a scenario of its corresponding workstation 1102 in the corporate network. Likewise, the BotSink 300 may be configured to implement some or all of the services implemented by its corresponding server system 1104.

Figure 12:
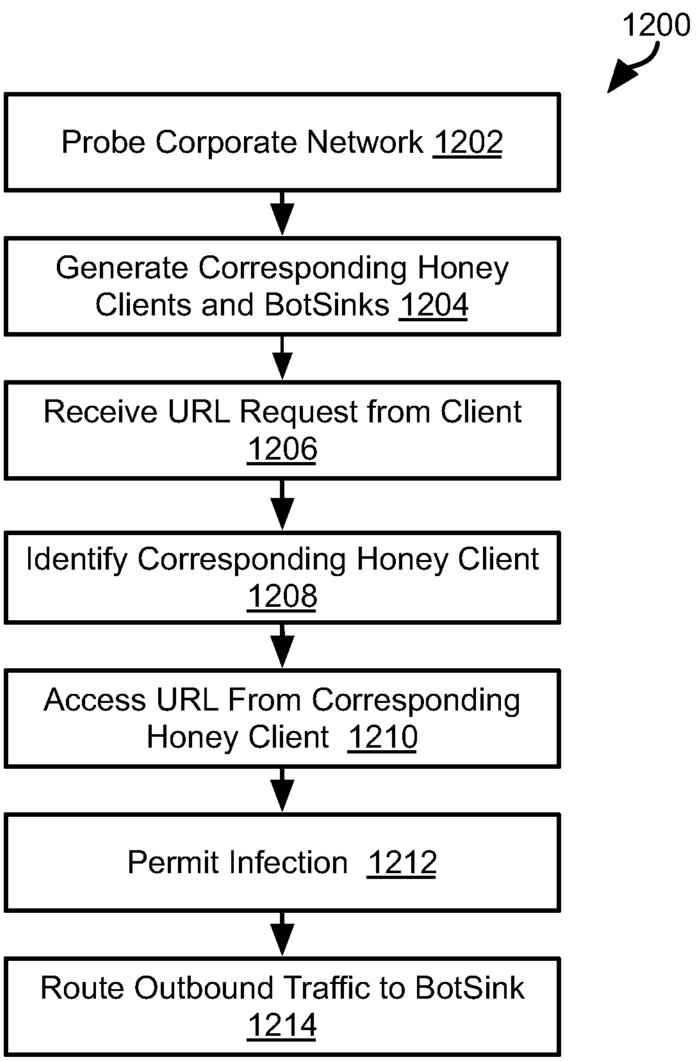
FIG. 12 is a process flow diagram of a method for generating and using a honey network in accordance with an embodiment of the present invention.

FIG. 12 illustrates a method 1200 that may be used to generate a honey network 1106 of honey clients 710 and BotSinks 300 mirroring a corporate network 1100. The method 1200 may be executed by a computer system executing a script or start-up application for setting up honey clients 710 and BotSinks 300 as described above. The method 1200 may, for example, be executed on the same computer system, or one of the computer systems, on which the honey clients 710 and BotSinks 300 are instantiated.

The method 1200 may include proving 1202 a corporate network 1100 in order to determine some or all of the IP (internet protocol) addresses and/or URLs of workstations 1102 and server systems 1104, a network topology (e.g. sub-networks and computer systems within sub-networks) of the corporate network 1100), interconnections between workstations 1102 and server systems 1104 of the corporate network 1100, scenarios of workstations 1102, network applications executing on the workstations 1102, services implemented on the server systems 1104, and like information.

The method 1200 may further include generating 1204 corresponding honey clients 710 and BotSinks 300 for some or all of the identified workstations 1102 and server systems 1104. Generating 1204 the corresponding honey clients 710 and BotSinks 300 may include: some or all of (1) Instantiating a virtual machine for each honey client 710 and BotSink or selecting an existing virtual machine.

(2) Instantiating a honey client 710, or selecting an existing honey client 710, for some or all of the identified workstations 1102.

(3) Instantiating a BotSink 300, or selecting an existing BotSink 300, for some or all of the identified server systems 1104.

(4) Configuring each honey client 710 from (2) with the scenario of the workstation 1102 for which the honey client 710 was instantiated or selected. Honey clients 710 may be configured to execute browsers for accessing URLs as well as other executable code such as PDF (portable document viewers) or other executable applications that may be used to process resources retrieved and which may be exploited by malicious code.

(5) Configuring each BotSink 300 with the services implemented by the server system 1104 for which the BotSink 300 was instantiated or selected at (3) as well as assigning a URL to the BotSink 300 corresponding to a URL of its corresponding server system 1104.

(6) Defining network connections or simulated network connections (i.e. bridges) between BotSinks 300 and honey clients 710 mirroring network connections between corresponding server system 1104 and workstations 1102. The method 1200 may further include receiving 1206 a request at a firewall 704 from a workstation 1102 for a resource located at a URL. The corresponding honey client 710 for the workstation 1102 from which the request was received may be identified 1208, i.e. the honey client 710 that was selected or instantiated at (2) to represent the workstation 1102. Step 1208 may be implemented by the firewall 710 or some other computer implemented module. For example, a mapping may be created that maps each honey client 710 to a workstation 1102 and maps each BotSink 300 to a server system 1104. In response to a request for a URL from a workstation 1102, the corresponding honey client 710 may be identified from the mapping.

The method 1200 may include accessing 1210, by the honey client identified at step 1208, the requested URL. The method 1200 may further include permitting 1212 a resource or remote system accessed by the honey client 710 using the URL in the same manner as described hereinabove. Likewise, traffic generated by the honey client 710 responsive to any malicious code executed in the honey client 710 may be permitted. In particular, traffic may be routed to a BotSink 300 or other honey client 710. As for other methods described herein, actions occurring on either of the honey client 710 and any recipient of traffic generated in the honey client 710 may be monitored and used to generate a schema as described hereinabove The systems and methods of FIGS. 11 and 12 advantageously enable the responses of the honey clients 710 and BotSinks 300 to more closely mimic those of the actual corporate network and enable more convincing deception of malicious computer system and code and more realistic engagement of malicious codes and systems.

Figure 13:
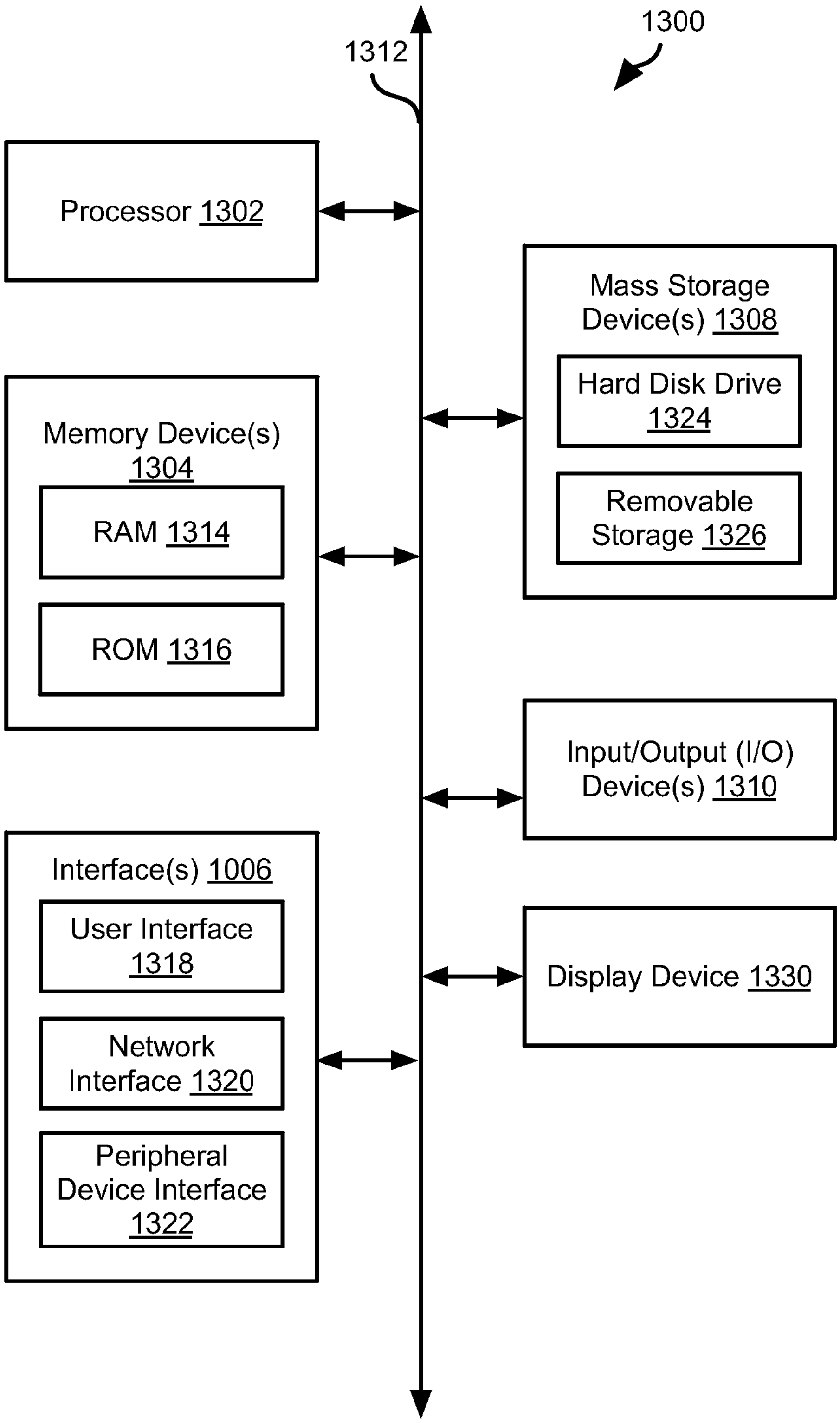
FIG. 13 is a schematic block diagram of a computer system suitable for implementing methods in accordance with embodiments of the present invention.

FIG. 13 is a block diagram illustrating an example computing device 1000 which can be used to implement the BotMagnet 180, the MDCE 185, 187, or 188, the Sinkhole 190, the Management Server or Monitor 195, the BotSink Appliance 300, user system 702, firewall 704, attacker system 708, and honey client 710. In some embodiments, a cluster of computing devices interconnected by a network may be used to implement these components of the invention. For example, a cluster could be used for large-scale services such as a higher-level MDCE 187 or a "global" MDCE 188. This could also be true for the Sinkhole 190, which could be a cluster/service shared by all of the BotMagnets 180 in a local network.

Computing device 1300 may be used to perform various procedures, such as those discussed herein. Computing device 1300 can function as a server, a client, or any other computing entity. Computing device can perform various monitoring functions as discussed herein, and can execute one or more application programs, such as the application programs described herein. Computing device 1300 can be any of a wide variety of computing devices, such as a desktop computer, a notebook computer, a server computer, a handheld computer, tablet computer and the like.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A method comprising:

receiving at a firewall computer system a request from a user system for a resource at a uniform resource locator (URL);

retrieving, by the firewall computer system, the resource and returning the resource to the user system;

accessing by a first virtual machine on one of the firewall computer system and a magnet computer system the resource;

detecting malicious activity corresponding to the resource in the first virtual machine;

generating a descriptor of the malicious activity;

transmitting the descriptor to the user system;

transforming the outbound traffic on the second virtual machine to obtain transformed traffic;

transmitting the transformed traffic to a destination specified in the outbound traffic; and receiving, on the second virtual machine, a response to the transformed traffic;

wherein generating the descriptor comprises correlating the response to the transformed traffic, the malicious activity corresponding to the resource in the first virtual machine, and the malicious activity on the second virtual machine.

2. The method of claim 1, wherein accessing by the first virtual machine the resource comprises:

accessing on the first virtual machine the resource using a plurality of browsers.

3. The method of claim 1, wherein accessing by the first virtual machine the resource comprises:

accessing on the first virtual machine the resource using a plurality of browsers each operating within a different operating system within the first virtual machine.

4. The method of claim 1, further comprising, blacklisting on the firewall computer system the URL.

5. The method of claim 1, wherein transforming the outbound traffic comprises setting a destination of the transformed traffic to refer to the second virtual machine.

6. The method of claim 1, further comprising:

detecting on the user system malicious code using the descriptor; and removing the malicious code.

7. The method of claim 1, detecting malicious activity corresponding to the resource in the first virtual machine further comprises permitting installation and execution of malicious code in the first virtual machine.

8. The method of claim 1, further comprising blocking outbound traffic from the first virtual machine.

9. A method comprising:

receiving at a firewall computer system a request from a user system for a resource at a uniform resource locator (URL);

retrieving, by the firewall computer system, the resource and returning the resource to the user system;

accessing by a first virtual machine on one of the firewall computer system and a magnet computer system the resource;

detecting malicious activity corresponding to the resource in the first virtual machine;

generating a descriptor of the malicious activity;

transmitting the descriptor to the user system;

discovering by the magnet computer system a topology of a corporate network including workstations and server systems;

instantiating a plurality of honey clients in the magnet computer systems, each honey client mapped to a workstation of the corporate network and implementing a virtual machine hosting an operating and browser corresponding to the workstation to which the each honey client is mapped, the first virtual machine being a honey client of the plurality of honey clients;

instantiating a plurality of sink virtual machines in the magnet computer system, each sink virtual machine mapped to a server system of the corporate network and implementing one or more services of the server system of the corporate network to which the each sink virtual machine is mapped; identifying the first virtual machine as being the honey client of the plurality of honey clients corresponding to the user system, the user system being a workstation of the workstations of the corporate network;

permitting outbound traffic corresponding to the resource from the first virtual machine;

routing the outbound traffic to a first sink virtual machine of the plurality of sink virtual machines;

detecting malicious activity on the first sink virtual machine;

wherein generating the descriptor comprises correlating the malicious activity corresponding to the resource in the first virtual machine to the malicious activity in the first sink virtual machine.

10. A system comprising:

a firewall computer system programmed to:

receive a request from a user system for a resource at a uniform resource locator (URL);

retrieve the resource and return the resource to the user system;

provide the URL to a honey client computer system;

the honey client computer system, the honey client computer system programmed to:

access by a first virtual machine the URL;

detect malicious activity corresponding to the resource in the first virtual machine;

generate a descriptor of the malicious activity; and transmit the descriptor to the user system;

wherein the honey client computer system is further programmed to permit outbound traffic corresponding to the resource from the first virtual machine;

the system further comprises a sinkhole computer system programmed to:

receive the outbound traffic on a second virtual machine; and detect malicious activity on the second virtual machine;

generating the descriptor comprises correlating the malicious activity corresponding to the resource in the first virtual machine to the malicious activity on the second virtual machine.

11. The system of claim 10, wherein accessing by the first virtual machine the resource comprises:

accessing on the first virtual machine the resource using a plurality of browsers.

12. The system of claim 10, wherein accessing by the first virtual machine the resource comprises:

accessing on the first virtual machine the resource using a plurality of browsers each operating within a different operating system within the first virtual machine.

13. The system of claim 10, wherein:

the honey client computer system is further programmed to report the URL to the firewall computer system;

the firewall computer system is programmed to blacklist the URL.

14. The system of claim 10, wherein the user system is programmed to:

detect malicious code using the descriptor; and remove the malicious code.

15. The system of claim 10, wherein detecting malicious activity corresponding to the resource in the first virtual machine further comprises permitting installation and execution of malicious code in the first virtual machine.

16. The system of claim 10, wherein the honey client computer system is further programmed to block outbound traffic from the first virtual machine.

17. A system comprising:

a firewall computer system programmed to:

receive a request from a user system for a resource at a uniform resource locator (URL);

retrieve the resource and return the resource to the user system;

provide the URL to a honey client computer system;

the honey client computer system, the honey client computer system programmed to:

access by a first virtual machine the URL;

detect malicious activity corresponding to the resource in the first virtual machine;

generate a descriptor of the malicious activity; and transmit the descriptor to the user system wherein:

the sinkhole computer system is further programmed to:

transform the outbound traffic on the second virtual machine to obtain transformed traffic;

transmit the transformed traffic to a destination specified in the outbound traffic; and receive a response to the transformed traffic;

wherein generating the descriptor comprises correlating the response to the transformed traffic, the malicious activity corresponding to the resource in the first virtual machine, and the malicious activity on the second virtual machine.

18. The system of claim 17, wherein transforming the outbound traffic comprises setting a destination of the transformed traffic to refer to the second virtual machine.

* * * * *